(12) United States Patent
Rodriguez et al.

(10) Patent No.: US 7,091,676 B2
(45) Date of Patent: Aug. 15, 2006

(54) ARC MAINTENANCE DEVICE FOR HIGH DENSITY DISCHARGE LAMPS INCLUDING AN ADAPTIVE WAVE FORM MONITOR

(75) Inventors: Reginald J. Rodriguez, Germantown, TN (US); David B. Crenshaw, Memphis, TN (US)

(73) Assignee: The Bodine Company, Inc., Collierville, TN (US)

( * ) Notice: Subject to any disclaimer, the term of this patent is extended or adjusted under 35 U.S.C. 154(b) by 296 days.

(21) Appl. No.: 10/471,939

(22) PCT Filed: Mar. 15, 2002

(86) PCT No.: PCT/US02/08220

§ 371 (c)(1),
(2), (4) Date: Sep. 15, 2003

(87) PCT Pub. No.: WO02/076151

PCT Pub. Date: Sep. 26, 2002

(65) Prior Publication Data

US 2005/0258765 A1    Nov. 24, 2005

Related U.S. Application Data

(60) Provisional application No. 60/276,150, filed on Mar. 15, 2001.

(51) Int. Cl.
*H05B 37/00* (2006.01)
(52) U.S. Cl. .......................... 315/307; 361/18
(58) Field of Classification Search ...................... None
See application file for complete search history.

(56) References Cited

U.S. PATENT DOCUMENTS

| 4,087,697 A | 5/1978 | Johnson ........................ 307/66 |
| 4,100,476 A | 7/1978 | Ghiringhelli ................. 315/297 |
| 4,195,233 A | 3/1980 | Udvardi-Lakos ............. 307/66 |
| 4,350,935 A | 9/1982 | Spira et al. .................. 315/291 |
| 4,355,261 A | 10/1982 | Cohen et al. .................. 315/47 |
| 4,398,130 A | 8/1983 | McFadyen et al. ......... 315/226 |
| 4,516,035 A | 5/1985 | Rhoads et al. ................ 307/66 |
| 4,612,478 A | 9/1986 | Payne ......................... 315/176 |
| 4,672,300 A | 6/1987 | Harper ........................ 323/222 |
| 4,686,424 A | 8/1987 | Nuckolls et al. .............. 315/86 |

(Continued)

OTHER PUBLICATIONS

International Search Report PCT/US02/08220.

*Primary Examiner*—David Vu
(74) *Attorney, Agent, or Firm*—Wyatt, Tarrant & Combs, LLP

(57) ABSTRACT

A supplemental arc maintenance electrical supply for a high density discharge (HID) lamp (L) for applying a high frequency supplemental arc voltage to maintain the arc during a period of unstable or intermittent AC supply in addition to or in lieu of the voltage or current being supplied to the lamp by the HID ballast (12). AC supply instability is identified in less time than the unstable or intermittent power will cause the lamp to arc to extingish and energize a supplemental arc maintenance electrical supply to maintain the arc of the lamp during the period of instability or interruption, so long as its internal, rechargeable battery is operational. The monitoring system (18) also recognizes the re-establishment of a stable (as by being a persistently repeating cycle but not necessarily a sinusoidal AC supply) repeating electrical power supply which is also of sufficient energy level to maintain operation of the HID lamp.

35 Claims, 21 Drawing Sheets

Block Diagram of Arc Maintenance System

U.S. PATENT DOCUMENTS

| | | |
|---|---|---|
| 4,692,854 A | 9/1987 | Baxter, Jr. et al. ............ 363/75 |
| 4,713,553 A | 12/1987 | Townsend et al. ............ 307/64 |
| 4,810,936 A | 3/1989 | Nuckolls et al. ............ 315/119 |
| 4,814,934 A | 3/1989 | Jones et al. ................... 361/88 |
| 4,873,471 A | 10/1989 | Dean et al. ................. 315/308 |
| 4,928,038 A | 5/1990 | Nerone ....................... 315/209 |
| 5,227,762 A | 7/1993 | Guidette et al. ........ 340/310 R |
| 5,229,651 A | 7/1993 | Baxter, Jr. et al. ............ 307/66 |
| 5,365,150 A | 11/1994 | Shiomi et al. .............. 315/209 |
| 5,569,984 A | 10/1996 | Holtslag .................... 315/307 |
| 5,579,197 A | 11/1996 | Mengelt et al. ................ 361/93 |
| 5,623,187 A | 4/1997 | Caldeira et al. ............ 315/307 |
| 5,801,494 A | 9/1998 | Herres et al. ................ 315/289 |
| 5,859,505 A | 1/1999 | Bergman et al. ............ 315/307 |
| 5,883,475 A | 3/1999 | Beasley ..................... 315/307 |
| 5,900,701 A | 5/1999 | Guhilot et al. .............. 315/307 |
| 5,909,082 A | 6/1999 | Speaker et al. ............. 313/570 |
| 5,952,794 A | 9/1999 | Bergman et al. ............ 315/307 |
| 6,075,326 A | 6/2000 | Nostwick .................... 315/307 |
| 6,100,607 A | 8/2000 | Olivieri et al. ............. 307/125 |

INPUT WAVEFORM SCALER & RECTIFIER

ARC MAINTENANCE DEVICE FOR HIGH DENSITY DISCHARGE LAMPS INCLUDING AN ADAPTIVE WAVE FORM MONITOR

CROSS-REFERENCE TO RELATED APPLICATIONS

This application claims benefit of prior U.S. Provisional Application Ser. No. 60/276,150, filed Mar. 15, 2001.

STATEMENT REGARDING FEDERALLY SPONSORED RESEARCH OR DEVELOPMENT

Not Applicable

BACKGROUND OF THE INVENTION

1. Field of the Invention

The invention relates to the maintenance of the arc in a high intensity discharge lamp during normal and emergency operation, as when there is an instability or a failure in the A-C power normally supplied to the ballast powering the lamp.

2. General Background of the Invention

High intensity discharge (HID) and other arc discharge lamps exhibit the undesirable characteristic of an extinguished arc which renders the lamp useless immediately after a momentary instability or failure in the AC power supplying the lamp. Should the normal, stable power supplying such a lamp be interrupted for as little as a four millisecond period, the arc of the lamp will extinguish. Following the extinguishing of an arc in such as a HID lamp, the remaining high temperature of the arc tube and high pressure of the gas within the tube render the restriking of the arc difficult without extraordinary means incorporated into the lamp and its ballast. This delay of the ability to restrike the lamp and have it reach full lumen output after unwanted arc extinguishing may last as long as 15 minutes.

One means of solving the restrike problem is to incorporate means within the lamp to develop a very high voltage pulse from a special igniter within the lamp. U.S. Pat. Nos. 4,355,261; 5,801,494; and 5,909,082 and the several patents referenced therein illustrate various approaches to incorporating starting and restarting aids into arc discharge lamps to provide a rapid restart in the event of an unscheduled, unwanted shut-down of the arc as by an instability in the AC supply to the lamp. While this style of accommodation to the undesirable time delay in restarting of such as an HID lamp is generally effective in getting the arc and lamp back on line, there are adverse effects upon the lamp. In general, the illustrated restart systems impose adverse high voltages and attendant high pressures within the arc tube, causing additional stress on the lamp components which cause additional wear and tear on the lamp and the likelihood of a premature failure or end of life cycle.

Alternative means to avoid a need to restrike the lamp arc include using an inverter running simultaneously with the AC ballast (as by being powered by an alternative power source, such as a battery) such that when the AC power fails, the inverter continues to run, maintaining power to the ballast and the arc during any mains AC power instability or interruption. The inclusion of such an alternative inverter may be as a means for just supplying a stabilized arc current in the event the normal supply fails or becomes unstable. Alternatively, the additional circuitry may include means for generating a specially stabilized waveform for powering the lamp, either continually or on demand. Means for specially stabilized waveforms for arc current supply have evolved in the growing utilization of higher frequency current supplies for HID lamps. Increased operating frequencies allow the use of lighter weight and smaller size transformers incorporated into the supply/control components for operating HID lamps, however, with these advantages, it has been observed that the lamps are now much more sensitive to variations in supply current/waveform and are subject to developing acoustic resonances in the internal arc current which can cause the lamp to fail. U.S. Pat. Nos. 4,612,478: 4,713,553; 4,928,038; 5,569,984; 5,900,701; and 6,0775,326 and the several patents referenced therein describe the problems to be overcome and the solutions propounded.

The present invention is distinguished from the prior art cited above in that it is a supplemental solution which operates in conjunction with the normal operating system (ballast) which operates the lamp. As such, it is easily incorporated into a HID ballast unit or as an add-on to an existing lamp system by merely being connected to the normal lamp arc supply circuit in a manner analogous to the connecting of an external emergency ballast to a fluorescent lamp. In its function, the present invention does not offer an alternative power supply to operate the lamp, i.e., supply power to the HID lamp ballast rather, it functions only to maintain the arc current during the momentary instability or failure of the regular AC supply. By thus maintaining the arc within the lamp, albeit at a significantly reduced output value (i.e., level of illumination), when the normal AC supply returns or a standby source such as a generator or UPS system comes on line, the lamp springs immediately to normal or near normal illumination mode, nearly to full rated output since the arc has not become extinguished during this time of instability of supply power. The present invention is adaptable to be included into HID lamps having internal emergency ballasts for maintaining operation for limited periods of mains AC failure as well as those systems utilizing a central battery system or a backup generator. The invention is particularly advantageous in those systems wherein there are momentary, as opposed to prolonged, instabilities in AC supply by virtue of the direct ability to maintain the arc in the lamp through the unstable power supply condition.

A collateral aspect of the present invention includes a waveform sensing and recognition system and method which can identify a changing electrical supply waveform which contains the requisite energy to support arc lighting at rated lumens, however in a varying or varied waveform different than that supplied by normal AC mains (i.e., square wave, half wave, rectified, etc.). The waveform monitoring of the arc maintenance system is thus adaptive in that the supplemental, battery supplied arc sustaining current will be continued for the requisite time during the change wherein a backup power supply might supply such as a square wave or otherwise non-sinusoidal supply, at which time the changed, but now stable waveform will be recognized as stable and capable of operating a lamp unassisted and the arc maintenance ballast returns to standby. The inventive method of waveform sampling and storage for signal monitoring and verification provides a waveform recognition mechanism which adapts to changes in electrical supply power, such as a voltage waveform, by first verifying that the waveform contains sufficient electrical energy to operate the lamp, and the sampling and storing of one full period of a "target" waveform, establishing it as a valid waveform for the stable power supply, and subsequently sampling and evaluating the next successive waveforms as a valid and acceptable supply waveform. Should a subsequently evaluated waveform deviate from the "target", the included high frequency inverter ballast is immediately energized to supply a "maintenance" current directly to the lamp to maintain the arc. During the period of supply instability or interruption, the arc maintenance current continues, and the waveform monitor continues to sample the supplied voltage waveform (AC or emergency power) to find an acceptable, repeating waveform capable of driving the HID lamp ballast and lamp, i.e., a new target waveform. Once the monitoring system identifies a voltage waveform of sufficient energy value to supply the HID lamp ballast and lamp, and that voltage is stable, as by its cycle repeating a predetermined number of times as compared to the new target waveform, the monitoring system turns off the arc maintenance voltage and the HID lamp operates "normally" from the verified supply. As may be recognized in such a system, the "acceptable" new "target" waveform envelope may be different from the previous "target" waveform, given that energy level and repeatability from cycle to cycle are the criteria, and so long as the compared new target waveform is identified as within the parameters currently selected, i.e., of sufficient "RMS" value to illuminate the lamp and the waveform is recognized as stable (i.e., repeating within the set parameters). In the present invention, the new target waveform conceivably may be a steady-state DC supply. Those skilled in the art may thus appreciate that the inventive waveform monitoring system may recognize as acceptable a waveform for a voltage supply which shifts from such as mains AC sinusoidal in form to that of a square waveform from an auxiliary generator or a battery-type uninterruptible power supply (UPS).

None of the known prior art systems for operating such as an HID lamp or a UPS provide an adaptive system and method for observing an instantaneous acceptable supply waveform which may change dramatically in form, yet be distinguished to be able to successfully supply an electrical apparatus such as an HID lamp. Alternative applications of the waveform monitoring system may incorporated to monitor power supplies to sensitive electrical, and electronic equipment, including computers to provide alarms or other indicia of the instability of the waveform of the power supply. With such embodiments, corrective action may be taken to keep such equipment on line, or merely have an operator made aware of the potential of erratic equipment operation. Alternatively, the invention may be utilized with waveform recording/storage apparatus, such as an oscilloscope, to identify and retain the particular waveform of an input voltage or current so that the irregularities in the waveform may be evaluated. The present invention readily identifies the particular "non-standard" waveform, thereby eliminating an otherwise tedious process of trying to capture these often random events.

SUMMARY OF THE INVENTION

It is an object of the present invention to provide a supplemental arc maintenance electrical supply for an HID lamp experiencing an unstable or intermittent AC supply wherein, during the period of instability, a voltage or current in addition or in lieu of the voltage or current being supplied to the lamp by the HID ballast.

An additional object of the invention is to provide an electrical power supply monitoring system for power to such as a HID lamp wherein the monitoring system can identify an unstable or intermittent power in less time than the unstable or intermittent power will cause the lamp arc to extinguish and energize a supplemental arc maintenance electrical supply to maintain the arc of the lamp during the period of instability or interruption, so long as its battery is operational.

An additional objective of the present invention is to provide an electrical power supply monitoring system which will identify not only an unstable or intermittent AC electrical power supply to such as an HID lamp, but also recognize the re-establishment of a stable (as by being a persistently repeating cycle but not necessarily a sinusoidal AC supply) repeating electrical power supply which is also of sufficient energy level to maintain operation of a load, such as a HID lamp.

A further additional object of the present invention is to provide a waveform monitor to be utilized in conjunction with an electrical waveform (such as voltage or current) recording or storage means, as an oscilloscope, to identify and retain an image of a waveform which departs from a preset standard.

A still further additional object of the present invention is to provide an alarm to a electrical load such as an electronic control or computer alerting an operator to the instability of the waveform of the supply current or voltage to the load such that the operator might anticipate irregular or spurious operation of the load.

These and other objects will become evident from the descriptions of the embodiments described in conjunction with the relevant figures attached hereto.

DETAILED DESCRIPTION OF THE PREFERRED EMBODIMENTS

Figure 1:
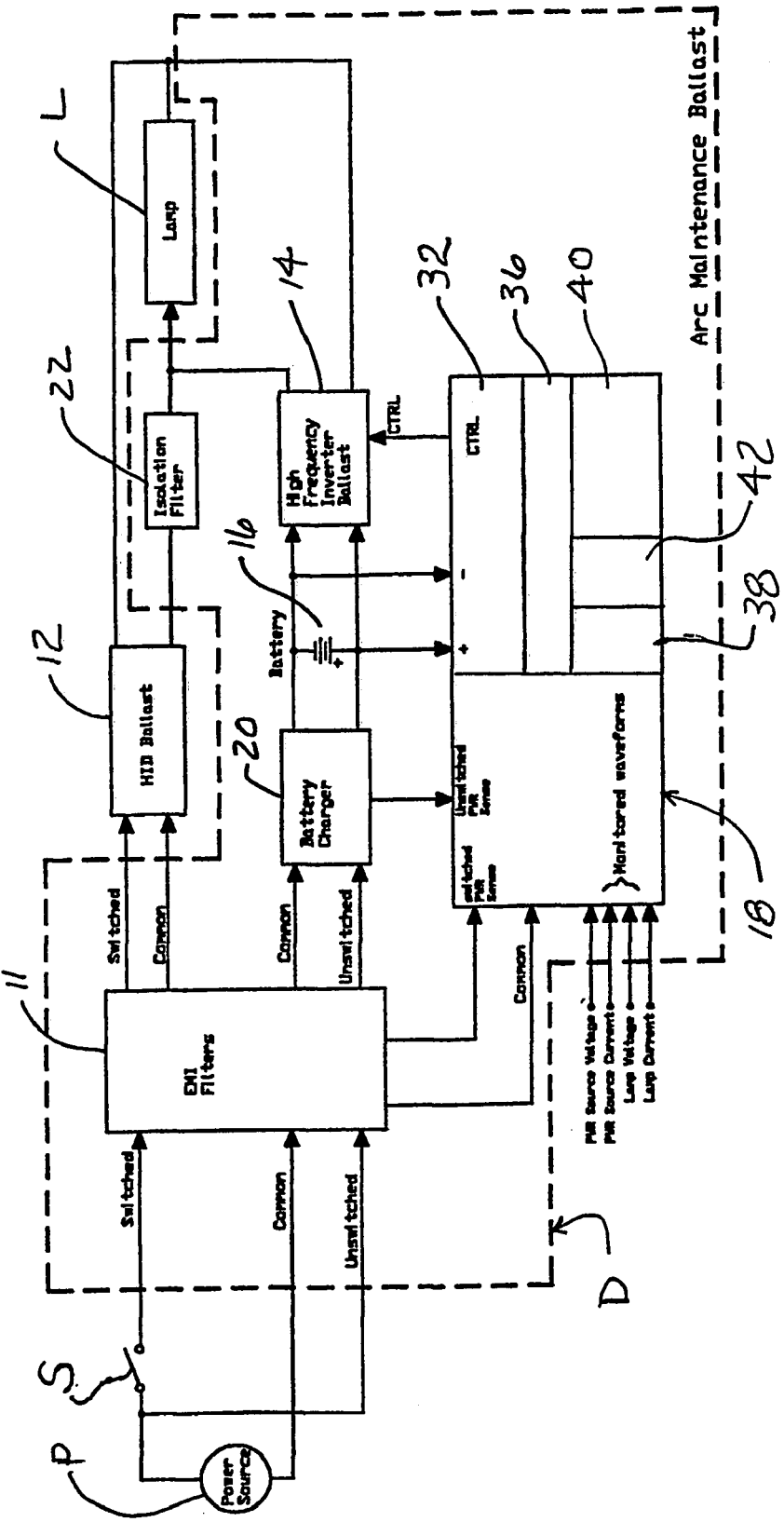
FIG. 1 is a block diagram of the system components of a preferred embodiment of the arc maintenance system according to the present invention including an adaptive input waveform recognition monitor.

Referring now to FIG. 1, the Arc Maintenance System embodiment of the present inventive waveform monitoring invention is illustrated in block diagram form as housed collectively in a ballast device D including its high frequency inverter ballast 14, battery 16, a monitor 18 including microcontroller 40 and battery charger 20 which are preferably incorporated into the hardware housing (though independent of the ballast of the HID lamp) of a conventional High Intensity Discharge (HID) lamp L, such as the type often employed where high levels of relatively efficient lighting are needed. These sights are typically indoor gymnasiums, sports arenas, auditoriums, retail outlets and other public buildings such as airports. Typical lamps of this type are high efficiency metal halide HID lamps employing a mixture of noble gases including xenon and argon, mercury vapor or a variety of metal halide vapors which are blended to obtain greater output and housed within a transparent envelope such as quartz. While these lamps efficiently provide high levels of light per unit of input electrical energy, they typically exhibit a sensitivity to unstable voltages or currents which are manifested in fluctuations in the supply voltage to the lamp. Unstable supply voltages result in the arc being extinguished when the voltage at the arc electrodes is momentarily insufficient to maintain conduction across the electrode gap. It is not uncommon for the arc in the arc tube of an HID lamp to extinguish if the power to the lamp is absent for as little as 4 milliseconds (which for a 60 Hz. system equates to one-fourth of a single cycle of the supplied power). Those skilled in the art appreciate that as long as the arc tube remains hot, the high pressure of the gas in the tube makes re-striking of the arc very difficult. As a result of this characteristic, the lamp may not restrike and reach its full intensity or lumen output for a period of as long as 15 minutes. As illustrated in some of the above cited patents, one means of solving this problem is to incorporate means in the lamp for applying a very high voltage pulse of 8 kv to 50 kv from an igniter where the normal arc voltage may be in the order of 300 to 500 volts. However, the use of the igniter stresses the arc electrode and tube and can greatly reduce the useful life of the lamp. It is known from the above mentioned '478 patent to utilize additional inverter that runs simultaneously with the lamp AC ballast in a dimmer control so that when the lamp illumination is lowered beyond the point which the regular ballast can sustain the arc, the continued operation of the parallel inverter keeps the arc from extinguishing in order to extend the dimming range. Such redundant means increase the purchase cost and size of the overall HID lamp ballasting system and its operating cost and installation flexibility. Such disadvantages are overcome in the embodiment incorporating this technology of the present invention to the present application to quickly identify a substandard waveform, initiate a maintenance current to the arc of the lamp and then identify a subsequent stable supply, should the subsequently examined waveforms of that supply exhibit the preset criteria.

Conventional HID lamps are typically operated with a magnetic ballast which operate at normal power line frequencies (50 to 60 Hz.). With the demand for lighter lamp units and ones which may be varied in their output intensities over a significant range, high frequency ballasts such as those operating at frequencies from 25 KHz to 40 KHz, even as high as 180 KHz are becoming increasingly popular for HID lamps. Those skilled in the art will appreciate that the high frequency operation permits the magnetic elements of the conventional ballasts to be reduced greatly in size and weight, allowing for a smaller, lighter package and utilization in a wider variety of applications, e.g., indoors for various lighting requirements. With the adaptation of HID lamps to higher frequency operation, other instabilities to arc operation are introduced, requiring elaborate internal control systems for detecting the unstable arc and providing control systems to stabilize the unstable arc and preventing its being extinguished at an unscheduled time.

Whether of the lower or higher frequency operation, the patents cited above illustrate several of the typical complex, expensive and only partially successful means for maintaining the continued operation of an HID lamp when the input power becomes unstable or temporarily interrupted.

Departure from the Prior Art

The present invention provides a novel approach to the continuing operation of an HID lamp by avoiding the extinguishing of the arc during the periods of input or supply power instability or interruption. The philosophy of operation of the inventive system is below described in flow chart format (in the section identified System Operation Overview) prior to the detailed description of circuit components. Rather than attempt to supplement the power operating the lamp system, i.e., by supplementing the power to the HID lamp ballast, the present invention concentrates on the catching of the arc and supplying voltage or current necessary to maintain the arc during the unstable period. Those skilled in the art should thus appreciate that rather than attempting to supply a significant quantity of power to the lamp to maintain somewhat normal output, the present system "merely" maintains the arc in a struck condition so that when stable power returns, either by normal AC mains or by a standby system such as an uninterruptible power supply (UPS), the arc is still struck so that the lamp may immediately be returned to normal operation. Likewise, those skilled in the art should recognize that "normal operation" in this situation does not mean full illumination, since as in the start-up of any HID lamp, some time is required for the particular gases to heat up to their normally operating ionized states to generate full illumination. With the present invention however, the starting point on return of stabilized power is an already struck lamp, providing some nominal illumination, with the requisite heat-up time being in the order of a few seconds. Depending upon the time which the arc is maintained and the corresponding drop in temperature of the gases in the arc tube, the maintained lamp arc can be back at full rated lumen output in as little as a few milliseconds to perhaps one to two minutes. Conversely to the experience with the conventional HID lamp, because the arc has been maintained, the hotter the gases are within the arc tube the more quickly that the lamp returns to full intensity or lumen output. The return to service is effected so quickly that in short power instabilities or interruptions, a variation in the lamp output may be unnoticeable. While the present invention might be utilized with a supplemental inverter operating in parallel with the HID ballast to merely supply the power required to prevent the arc from extinguishing, the identified advantages of simplicity of installation and a small size capable of flexible installation with an HID lamp require that the arc maintenance voltage with the inventive power supply waveform monitoring is incorporated such that the arc voltage is supplied only while, the monitor notes that the AC (or for that matter, the back-up power supply) is unstable such that the arc of the lamp might be prevented from becoming extinguished.

The monitor of the present invention rapidly detects a short duration power (AC mains or back-up) power variation (e.g., voltage or current sag or swell), a momentary power interruption, long duration variation (under voltage or over voltage), power transient, or any other potential or actual power source failure ahead of the primary ballast, and catch the arc and maintain it for a period of time determined by the battery pack provided, which those skilled in the art should recognize as an operations driven choice based upon the nature and duration of outages to be protected against. With the disclosed invention, once the primary power source (AC mains) or secondary power source (back-up generator or UPS) returns, the monitor of the invention checks the stability of the source (its voltage, current or power waveform) and if within the envelope necessary to keep the arc struck, relinquishes control of the arc by shutting off the supplemental arc maintenance supply.

FIG. 1 illustrates the Arc Maintenance Device control D of the present invention which is connected to a power source P, which may be the AC mains as from electric utility service or standby power provided by a standby generator or a UPS. Power from power source P is routed to electromagnetic interference (EMI) filters 11 which provide isolation to the power source P from high frequency which may be generated by either or both of the internal HID lamp ballast 12 or the high frequency inverter ballast 14 which provides the voltage to maintain the arc in lamp L upon sensing of an unstable power source P, as will be later explained. Device D includes rechargeable battery 16 to power high frequency inverter ballast 14 on event of interrupted power or unstable power as sensed by monitor 18, both of which are isolated against feedback of electromagnetic interference from the high frequency inverter ballast 14 by filter 11. Battery charger 20 is connected to battery 16 and operates during operation of lamp L to maintain or recharge battery 16 at full charge should it have had to power high frequency inverter 14 upon command of monitor 18. Isolation filter 22 is disposed intermediate lamp L and its ballast 12 so that the arc maintenance voltage may be supplied to lamp L simultaneously with voltage from the lamp ballast 12 while power source may be unstable to the degree that its instability cause the arc of lamp L to otherwise be extinguished. Those skilled in the art should recognize that device D is preferably a self-contained unit which, because it may be assembled into a compact package, may be incorporated into the fixture housing of a particular HID lamp L along with the lamp's HID ballast 12. In its preferred form of such a unit package, device D includes a rechargeable battery 16, a battery charger 20, a monitor 18 including such as a microcontroller 40 for identifying the unstable voltage supply to the lamp L and for directing the arc maintenance current to the lamp L as from an included high frequency inverter ballast 14. However, should an installation be desired at a remote location as with a central battery system or a standby generator, the flexibility of the present invention permits these alternative embodiments.

System Operation Overview

Figure 2:
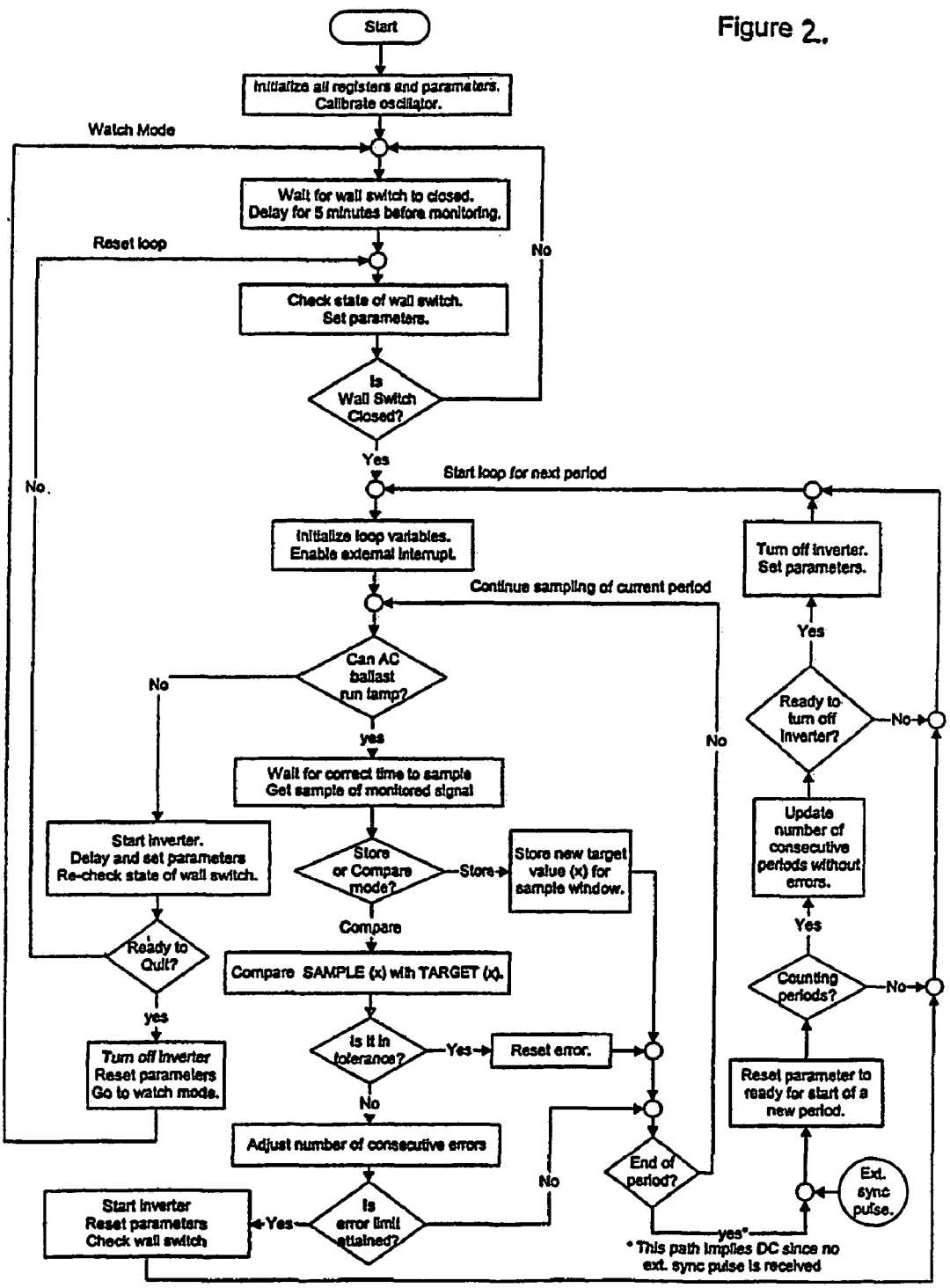
FIG. 2 is a flow chart illustrating the monitoring procedure according to the present invention.

Monitor 18 provides numerous functions in the determination of whether and when to cause the high frequency inverter ballast 14 to provide power to lamp L to sustain the arc. Monitor 18 observes the waveform (level and envelope) to assess whether it is stable (changing no more than the preset limits from single waveform to successor waveform) and can thus support continued illumination or is approaching an instability which can cause the arc to be extinguished. FIG. 2 illustrates in flow chart form the sequence of events by which monitor 18 controls the supplying of an arc maintenance current from device D. Those skilled in the art will recognize that the waveform monitor may also be incorporated into other functions where there is a need to identify a changing waveform. As will be appreciated from the subsequent description, the disclosed monitor can follow the changing waveform from one envelope to the next, continually assessing the ability of the shape values to provide a requisite level of energy to support a load, or the resume support of a load.

For the illustrated embodiment of an application to an HID lamp, the sequence of steps begins at START, which occurs when power is initially applied to the monitor 18 as by initial installation and connecting it to the power source P, the microcontroller 40 is initialized with preset parameters and the oscillator which runs the timer for the system is calibrated. The monitor 18 then enters the WATCH MODE during which microcontroller awaits an event, the first significant one being WALL SWITCH CLOSED. This event recognizes the closing of a switch by which the lamp L is illuminated. When the wall switch S is closed, the microcontroller sets a delay and awaits a nominal time (such as 1 minute for the described lamp and system) for the lamp L to come to stable operation. After the delay, microcontroller 40 again checks the state of the wall switch to verify that it is in the lamp operating mode (the assumption is that if the switch is in the lamp operating mode, that the lamp L is on and that the user does desire the lamp to be on), and microcontroller 40 again resets all of the monitor system parameters to be prepared for monitoring the power source P (such as the voltage in the illustrated embodiment), including initializing of loop variables and enabling of an external interrupt signal or pulse. The monitoring program uses an INTERRUPT PULSE (also sometimes referred to as a sync pulse) timed to occur at or near the beginning of each cycle or waveform period of the supply voltage (initially that from AC mains at power source P). The occurrence of this INTERRUPT PULSE is denoted the EXTERNAL INTERRUPT. Enabling of EXTERNAL INTERRUPT awakens the microcontroller 40 to accept and note the INTERRUPT PULSE as it occurs. Monitor 18 is then, through microcontroller 40, ready to specifically begin the task at hand of monitoring the power source voltage to examine it for its capacity to keep the lamp L illuminated. The first step is for microcontroller 40 to determine CAN AC BALLAST RUN LAMP. This is a gross test wherein the microcontroller 40 verifies the AC supply voltage is at a sufficient energy level for the HID ballast 12 to keep the lamp L illuminated, and if at or above a predetermined level, indicates YES to begin the inventive signal monitoring, the details of which will be subsequently described. Microcontroller 40, driven by its internal clock, WAITS FOR CORRECT TIME TO SAMPLE and upon receiving the appropriate sync pulse (which indicates the beginning of a period, e.g., a cycle of the AC power), initiates GET SAMPLE OF MONITORED SIGNAL, which as subsequently explained amounts to retaining in memory the value of a predetermined number of data points in the power supply P voltage waveform (FIG. 3, later described) to the HID ballast 12, and presents the sampled waveform (via the series of data points) to the STORE OR COMPARE MODE, which first stores that single "target" waveform for later comparison and then goes to COMPARE MODE wherein the present signal waveform is compared with the prior "target" signal waveform data point by data point. If the presently compared waveform passes the IS IT IN TOLERANCE test (i.e., is within the sample window of the corresponding "target" data point [see FIG. 3 and related description]), the microcontroller 40 resets an error indicator (RESET ERROR) telling the monitor and microcontroller that everything is operating normally. In the described embodiment wherein successive waveform data points of a period (cycle) are examined, a "pass" is recorded so long as there are no more than three consecutive out-of-range data points. As subsequently explained in the description of the sampling method, in the present embodiment for a low frequency HID (i.e., one operating at about 50 to 60 HZ.), the number of out of tolerance waveform data points accepted prior to energizing the arc maintenance current is three, which is determined by the speed of sampling (microcontroller 40 clock speed and width of sampling window, all subsequently explained). After RESET ERROR triggered by an "in tolerance" data point, the microcontroller 40 checks for END OF PERIOD (i.e., is there a sync signal?) and upon noting NO, continues through a repeat of the just described sampling of data points. Should microcontroller sense YES at the END OF PERIOD challenge, as by receiving an external sync pulse indicating the start of a new AC power cycle, the microcontroller 40 initiates RESET PARAMETERS TO READY FOR START OF A NEW PERIOD and then checks whether the system is counting periods (as provoked by an out of tolerance state). If the data points have been acceptable, the answer is NO and the microcontroller 40 goes back to continuing the check of data points according to the previously stored "target" waveform. Should there be no external sync from the AC power cycle, the microcontroller 40 times out waiting for it and initiates an interrupt/synch pulse to continue the program. After the reset for a new period provoked by an out of tolerance observation provoking the establishment of a new "target" waveform, the microcontroller begins counting successive acceptable "in tolerance" waveform periods with an ultimate objective of turning the high frequency inverter ballast 14 off when the criteria is met. In the illustrated embodiment for maintaining the arc in an HID lamp, 30 successive "in tolerance" waveforms is set as the parameter to be met, thus the microcontroller goes through the sub-routine of comparing data points for successive periods as described above and COUNTING PERIODS, UPDATE NUMBER OF CONSECUTIVE PERIODS WITHOUT ERRORS, READY TO TURN OFF INVERTER, and TURN OFF INVERTER, SET PARAMETERS, until the requisite standard is met. When high frequency inverter 14 is turned off by microcontroller 40 after having met the described criteria, the microcontroller returns to the regular sample, compare routine. It should be noted, and is further explained in the following detailed description of the waveform sampling method, that the new target waveform may be substantially different in appearance than the initial AC mains waveform, the criteria being that the waveform deliver an acceptable level of "RMS" value of current (i.e., contain sufficient energy) to the HID ballast 12 to be sufficient to power the lamp, as by being supplied by an inverter in a central battery (UPS) system or a standby generator in a stable form. Another of the remarkable capabilities of the present inventive system is that monitor 18 is able to adapt to such as a DC, trapezoidal, and square waveforms, so long as the sampled waveform (voltage, current, instantaneous power) has a sufficient energy ("RMS") value and is stable over the required number of consecutive cycles, 30 in the illustrated embodiment.

Should the COMPARE SAMPLE WITH TARGET and IN TOLERANCE produce a NO, the microcontroller notes the number of consecutive errors or out of tolerance notations (ADJUST NUMBER OF CONSECUTIVE ERRORS) and compares that with the IS ERROR LIMIT ATTAINED. If NO (a limit of three in the present embodiment), sampling continues with the routine going back to the END OF PERIOD and if the answer is NO, microcontroller continues sampling of the current period by reentering the routine at CAN AC BALLAST RUN LAMP. Should the IS ERROR LIMIT ATTAINED be answered YES, microcontroller 40 starts the high frequency inverter ballast 14 with START INVERTER, RESET PARAMETERS, to start the loop for the next period and checks the wall switch to determine that the lamp L should continue to operate and then reenters the routine at INITIALIZE LOOP VARIABLES AND ENABLE EXTERNAL INTERRUPT to start the sampling and storage of another "target" waveform. The CAN AC BALLAST RUN LAMP test is referred to as the "RMS" value logic test and is an expedient approximation of the root-mean-square value of the AC input. Those skilled in the art will recognize that a traditional RMS calculation requires significant time and requires the average (integral) to be over a full period of the signal. In the present invention, there is a need to quickly identify an insufficient supply in order that the arc maintenance current may be supplemented should the AC supply become unstable. Effectively, there is insufficient time for a traditional RMS calculation to determine whether the incoming supply has sufficient energy to sustain the lamp L, so in the present invention, the "RMS" value logic calculation rectifies the incoming signal and takes a "soft average" as later illustrated, to quickly identify an equivalent DC value. In the illustrated HID lamp arc maintenance embodiment, so long as this "RMS" value is about or above 70% of that for the full AC supply, it is recognized as acceptable by microcontroller 40 and the answer to the question CAN AC BALLAST RUN LAMP is "yes".

In the setup of the microcontroller 40 routine, should the CAN AC BALLAST RUN LAMP be answered NO, the high frequency inverter ballast is started, and the initialization of the microcontroller routine is initiated with DELAY AND SET PARAMETERS and RE-CHECK STATE OF WALL SWITCH, with the added interrogatory READY TO QUIT, which is the status check of the wall switch, and if it is in the "off" position, the answer is YES and the microcontroller turns off the high frequency inverter ballast 14, resets the system parameters which then goes into watch mode until the wall switch is again closed signaling lamp operation.

Waveform Sampling and Monitoring

Figure 3:
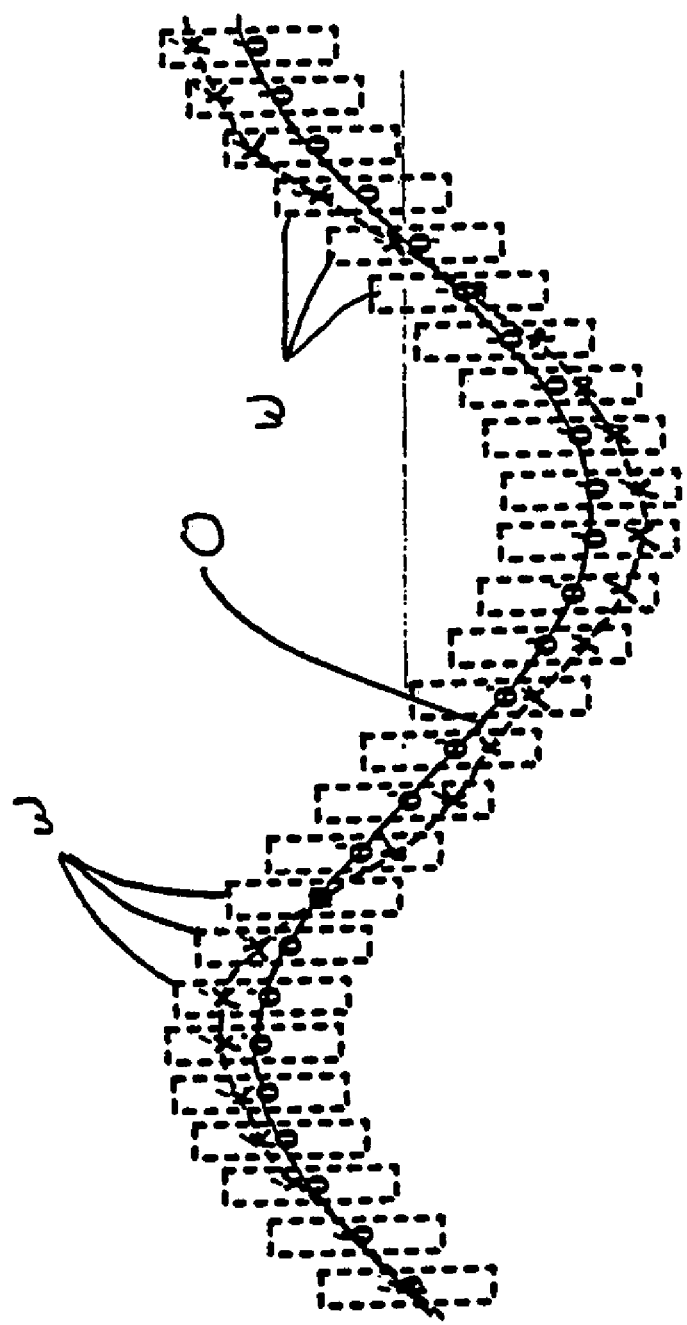
FIG. 3 is a diagram of the waveform sampling method processed by the microcontroller circuit in the present invention.

FIG. 3 illustrates an example of a waveform monitored according to the method of the present invention. One skilled in the art should appreciate that the waveform monitored may be of a variety of parameters: AC line voltage (power source P); AC line current; instantaneous AC input power, lamp L current, lamp L voltage, instantaneous lamp L power, and the DC rail voltage of an electronic HID ballast are but a few of the parameters which could be monitored in a system such as that illustrated for an HID lamp wherein an arc maintenance current may be supplied when the input to the lamp ballast 12 is insufficient either because of being unstable or interrupted to support the normal operation of the arc of lamp L in delivering full or near full illumination. Later described will be applications of the monitoring method and system wherein other waveform power/input level sensitive systems require a quick, uncomplicated signal monitor to trigger backup power, signal or an alarm. Using the very rapid error sensing capability (based upon the windowing technique described) a trigger signal may be provided that is usable to control any device having a waveform based input. Examples of such applications are in the triggering circuits of oscilloscopes to provide capture of the smallest change in a waveform; monitor the integrity of a periodic waveform, such as line voltage, and turn on an alarm or signal (i.e., an LED) to indicate that a change is occurring; as a power quality monitor to store or capture waveforms only when disturbances occur to alleviate constant or continuously recording; complement triggering circuits in sensitive alarm systems; and in machine tools to trigger a shut-off of a machine for operator safety. In the illustrated embodiment for maintaining the arc of an HID lamp, the waveform monitored is input voltage, which at the outset is the AC line voltage from an electric utility, i.e., nominally 60 Hz. The initially observed waveform is designated O, of which slightly over one period (or cycle) is depicted. Also illustrated and superimposed over waveform O are the sampling "tolerance" windows W examined by microcontroller 40, represented in dashed lines. Waveform O represents the last observed waveform having a sufficient "RMS" value to power lamp L by means of the HID ballast 12. Waveform O which thus becomes the "target" waveform is stored in microcontroller 40 by the sampling of the chosen parameter, here AC or supply voltage, in each one of the tolerance windows W for one full cycle (or comparable period of time), the representation being the sequence of waveform data points O' recording the value of the waveform (here O) at the center of the sampling window W. The next succeeding waveform X will be examined data point by corresponding data point O' of target waveform O. As previously described above, so long as three successive data points X' don't fall outside the window W set for their corresponding "target" data point O', comparison of data points continues and not arc maintenance action is taken. The number of sampling/tolerance windows and corresponding sampled points are selected as a function of the monitored waveform's frequency (if periodic), the sampling rate, and the available memory in the microcontroller 40 for storing the data points O'. The fastest sampling rate and minimum width of sampling window W are both limited by the microcontroller's clock frequency and analog to digital conversion time. The dimensions of the sampling windows are chosen based upon the inherent noise (both amplitude and time) in the waveform, and the level of noise the particular system to which the power is being supplied (here the arc of the lamp L). As related above, the typical HID arc will extinguish if power is interrupted for a period of as little as 4 milliseconds. Therefore, in the present embodiment, a change in the power supply waveform which would interrupt power to the lamp L must be identified in less than 4 milliseconds and the alternative or backup source must be initialized in less than that period to prevent the arc from extinguishing. In the present embodiment, the parameters of data collection, assessment and initiation of the arc maintenance current to occur in about 1.5 to 2 milliseconds, providing a cushion of time for reliability. The chosen width of the sampling window for low frequency monitored waveforms in the present embodiment where the AC supply is 60 Hz. is 256 microseconds, which allows 65 data points for the time period of about 16 milliseconds which represents one cycle of a 60 Hz. supply. To ensure a catch of the arc within about 2 milliseconds, the illustrated system may accept as many as three consecutive erroneous data points (by initiating action on the third consecutive out of tolerance data point) and supply the described arc maintenance current to lamp L within 2 milliseconds, thereby meeting the goal of preventing the extinguishing of the arc. In the illustrated embodiment, the amplitude of the sample window is selected to be about 8 percent of the maximum expected peak value of the monitored line waveform. Those skilled in the art will thus recognize that if the response to a noted unstable waveform is to be faster, as by being a higher frequency waveform, clock speed must increase. Likewise, if more data points are needed, or the examined waveform has a higher frequency, smaller windows may be required. By making such assessments, the illustrated inventions may be readily adapted to alternative embodiments.

Adaptive Waveform Capability

As described above, in the COMPARE mode, so long as the present waveform X (FIG. 3) meets the criteria of acceptability, namely it has sufficient "RMS" or energy value and no more than three consecutive data points fall outside the tolerance limits for the points, then the present waveform X is deemed valid. If the present waveform X (FIG. 4) does not meet the criteria of acceptability, namely it does not have sufficient "RMS" value (energy) or has 3 consecutive data point errors, then the inverter 14 is started to maintain the lamp arc and the routine returns to acquire a new "target" waveform, whether valid or not, provided the "RMS" value is sufficient. The target waveforms continue to be sampled and replaced until one complete period of the new present waveform X is compared favorably to the target waveform O and found to be error-free, e.g., has less than three consecutive, out of tolerance data points. Those skilled in the art would thus appreciate that the new measure of an acceptable "target" waveform has been established independently from the earlier stored waveform as an instantaneous value not as a weighted or averaged value. Therefore, the waveform monitoring system is allowed to follow (i.e., track and accept) a continually adjusting supply waveform so long as the next succeeding waveform varies in an amount not exceeding the parameters of the tolerance window W, which are now centered on the newly stored target waveform. The objective is that the monitored supply waveform may change to a waveform of a trapezoidal, square or other repeating form, so long as the new waveform meets the selected criteria of acceptability described above, i.e., repeatability and "RMS" value. In the instance of a more rapid shift of the supply, including to an input of steady DC, the waveform monitor has the capability to recognize the newly stabilized input (i.e., square, trapezoidal or DC) such that each newly received (present) waveform passes the sufficient energy ("RMS") test, and the requisite number of observed "acceptable" waveform periods (not deviant from the prior observed and stored waveform) have been counted in the microcontroller. This is accomplished in the UPDATE NUMBER OF CONSECUTIVE PERIODS WITHOUT ERRORS, and the system stabilizes on the new standard waveform, turns off the high frequency inverter 14 and continues to operate with the standby power supply now considered as "normal" within the arc current maintenance system. As should be appreciated, when normal AC main current (60 Hz.) returns, the arc maintenance device will recognize the initial "standard AC power" as erroneous (because the waveform sampled does not match the immediately previous one stored as the "instantaneous standard"), turns on the inverter 14 to ensure continuation of the arc in the lamp L, until the system stabilizes to the new, repeatable input waveform is accepted as capable of running the lamp L and is stable, as described above.

Figure 4A:
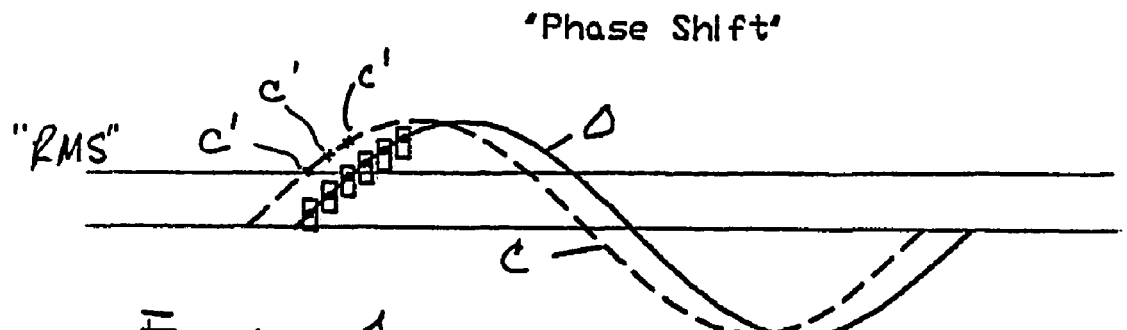
FIGS. 4a–c are a diagram of deviant waveforms identified by the system and method of the present invention.
Figure 4B:
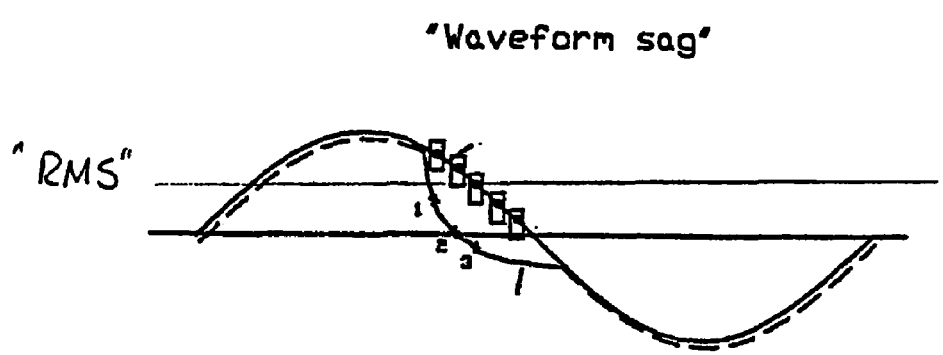
Figure 4C:
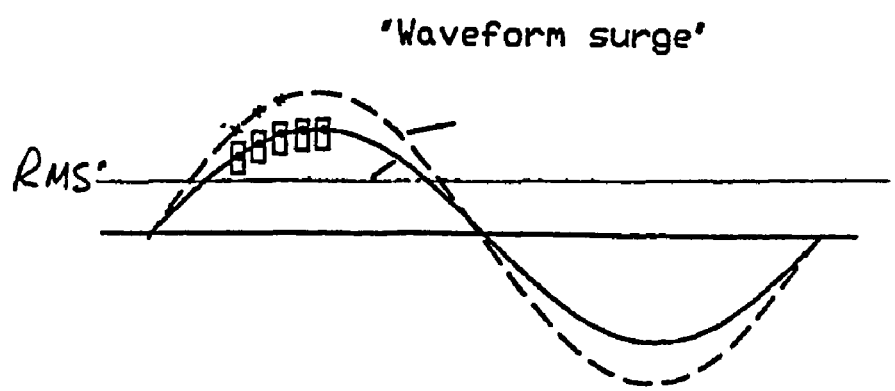

FIGS. 4a through 4c illustrate different aberrations from the target waveform O, each of which, when sensed by microcontroller, will cause activation of the high frequency inverter ballast 14 and a supply of arc maintenance current to lamp L. The aberration illustrated in FIG. 4a is that of a phase shift from target waveform O wherein the corresponding data points C' of current waveform C are located above the target waveform O, which if persists for three consecutive samples, will cause the monitor to energize the high frequency inverter 14 until the system again stabilizes, as previously described. The aberration illustrated in FIG. 4b is that of a waveform sag which is also readily identifiable by the arc maintenance device of the present invention. A third illustrated aberration is that of FIG. 4c wherein the amplitude of the waveform has increased. Of note is that all three of the above waveforms may contain sufficient energy or "RMS" value to support powering of the lamp L by its ballast 12, however the monitor 18 will initiate the high frequency inverter in the present invention until the input supply waveform is recognized as "stable" by the repeatability of the waveform.

Detailed Circuit Description

Figure 5:
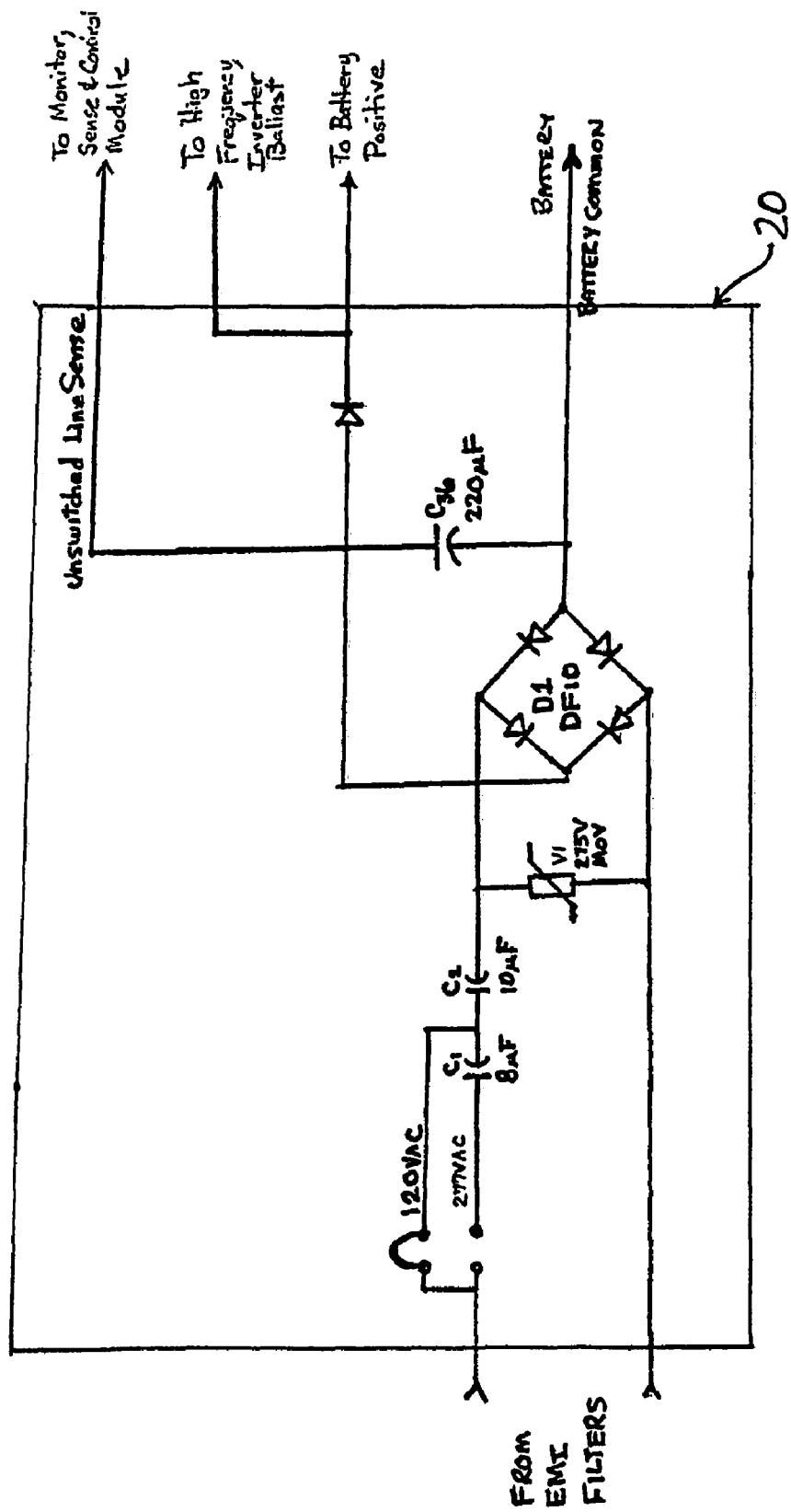
FIG. 5 is a circuit diagram of the battery charger of the arc maintenance device of the present invention.

Referring now to FIGS. 1 and 5 through 15, the circuitry making up the present invention will be described and illustrated. FIG. 1 is the overall block diagram of the arc maintenance system D of the present invention, illustrating also the connection to lamp L and the HID ballast 12 which drives it. FIG. 5 illustrates the battery charger 20 for battery 16 (illustrated on FIG. 1), which provides a continuous charge on the internal battery 16 which provides the arc maintenance power in the event of an unstable or interrupted supply to HID ballast 12. As those familiar with battery chargers for emergency lighting systems in general, voltage connections are usually provided for connection to standard commercial AC voltage supplies, 277 VAC for commercial and 120 VAC for residential applications. FIG. 5 illustrates typical components of a battery charger, for such as a rechargeable battery of the nickel cadmium type utilized in the illustrated system, which in the present embodiment receives its input from the AC supply through EMI filters 11 to isolate the input supply to the system D from noise which might be generated during the operation of system D. Those skilled in the art will recognize that it is important that commercial electrical supply from such as an electrical distribution system be isolated from internal noise generation of receiving components. Outputs from the battery charger 20 are provided to monitor 18, the high frequency inverter ballast 14 and battery 16.

Figure 6:
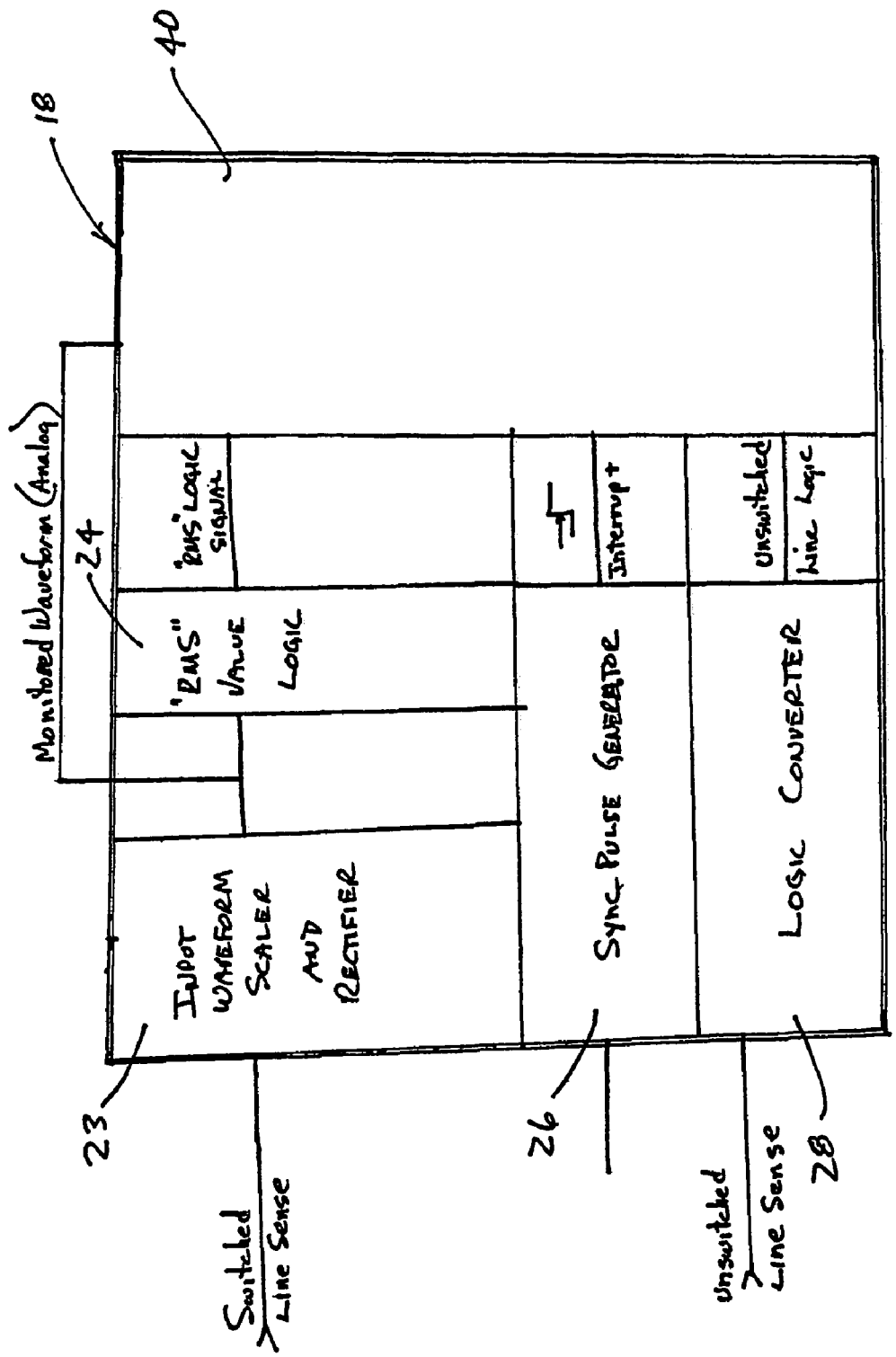
FIG. 6 is a circuit diagram of the monitor circuit of the arc maintenance device of the present invention.
Figure 7:
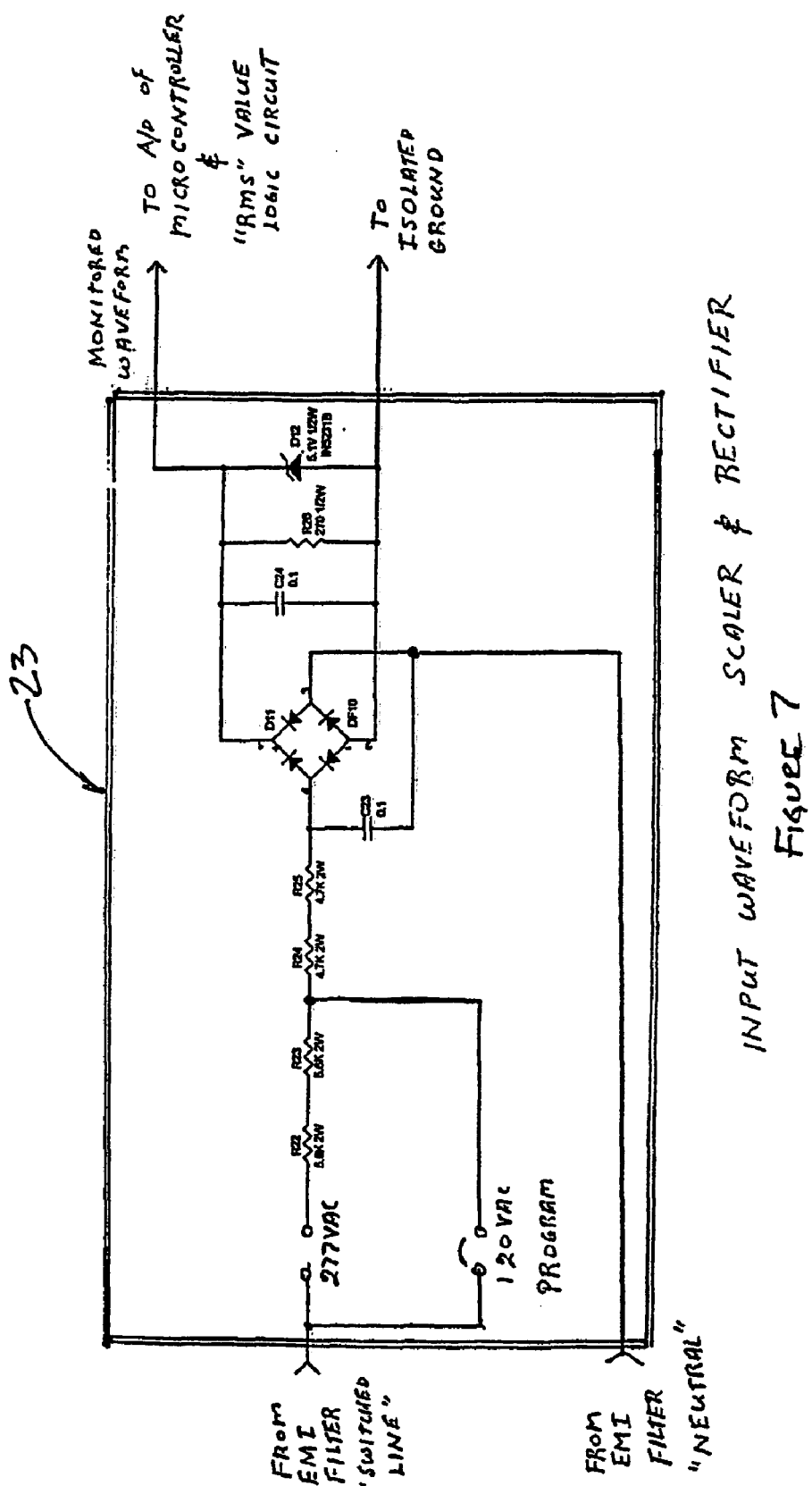
FIG. 7 is a circuit diagram of the input waveform scaler and rectifier of the arc maintenance device of the present invention.
Figure 8:
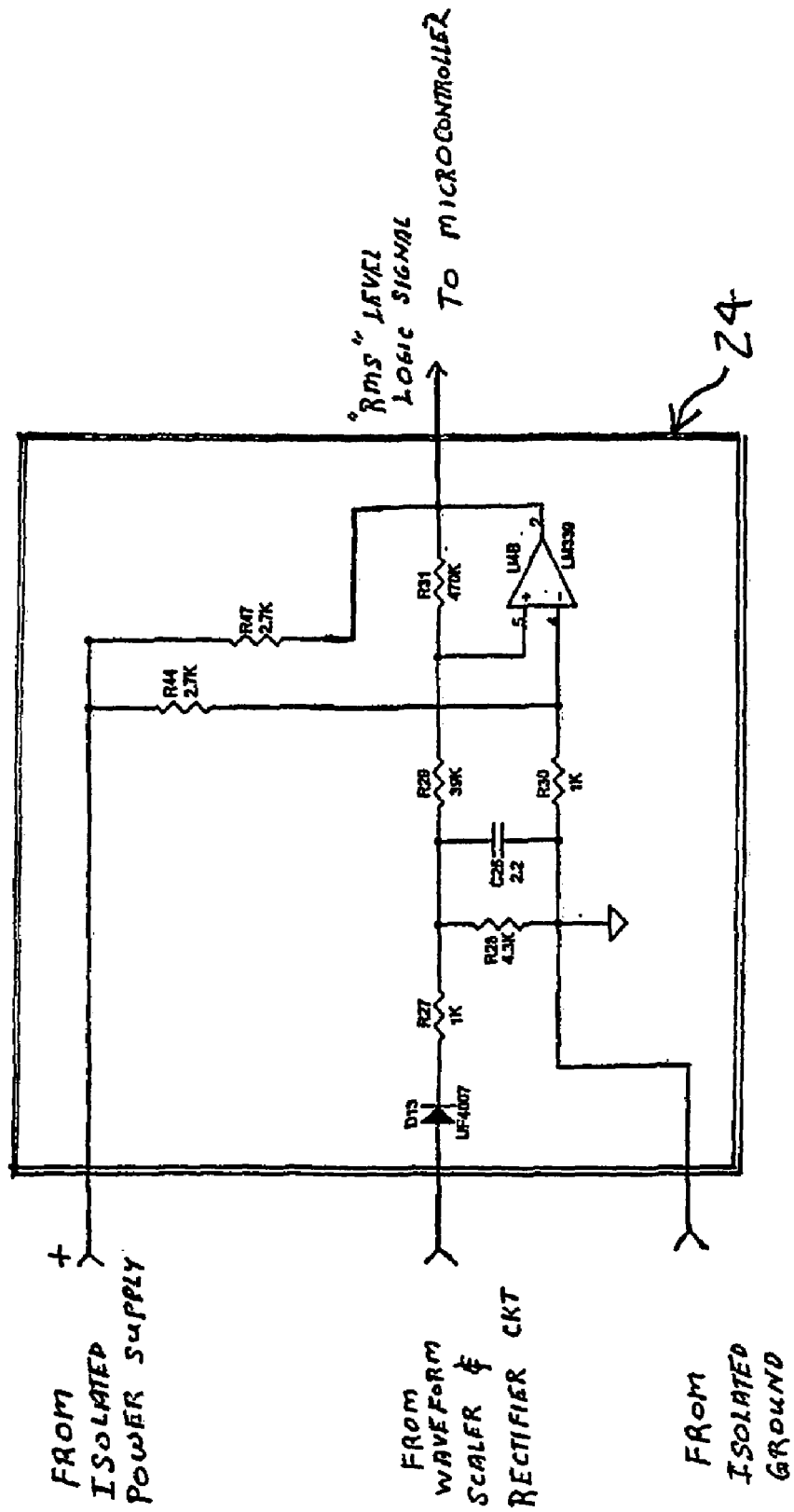
FIG. 8 is a circuit diagram of the "RMS" value logic circuit of the arc maintenance device of the present invention.
Figure 15:
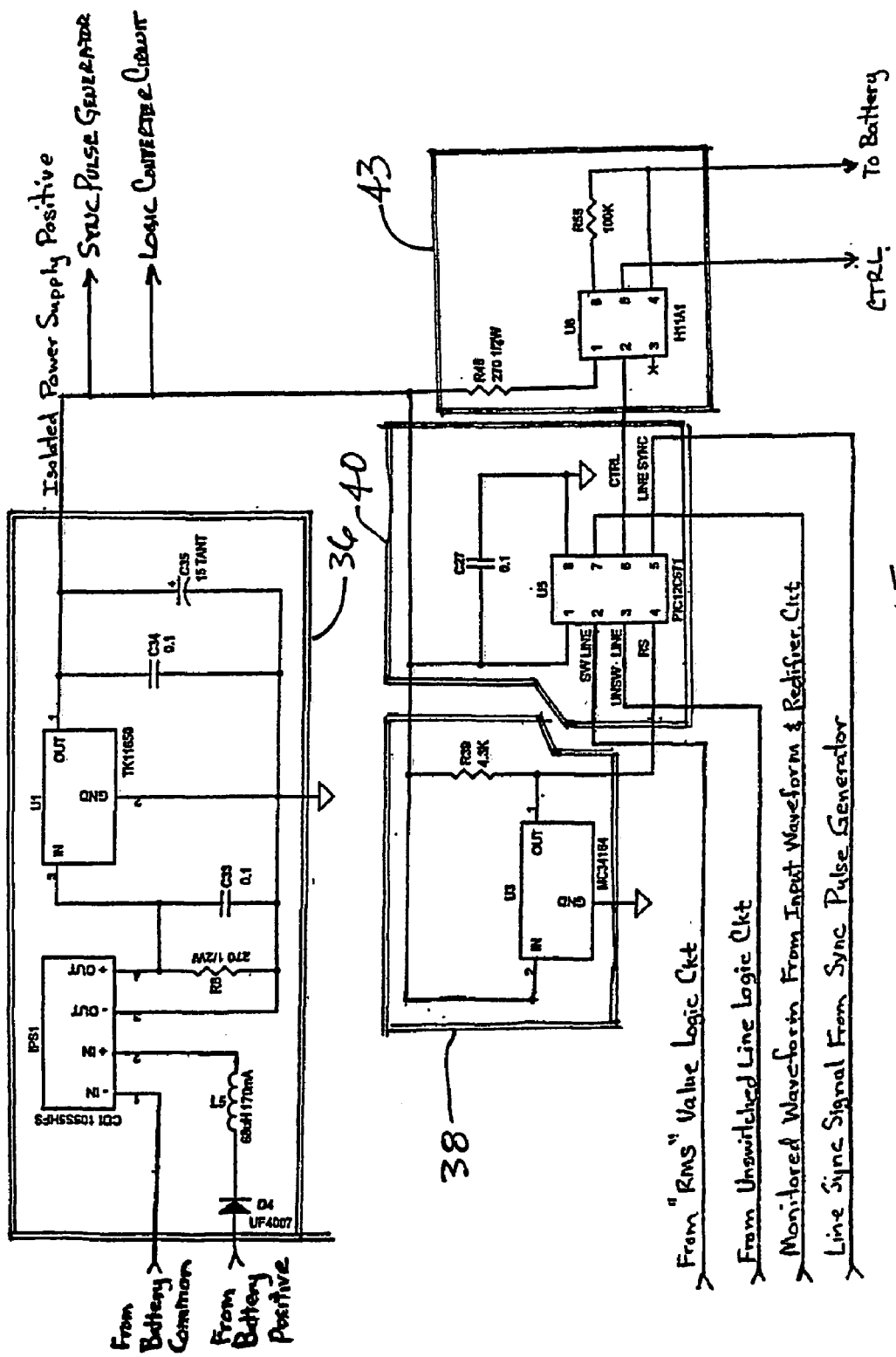
FIG. 15 is a circuit diagram of the microcontroller, isolated power supply and related circuits of the arc maintenance device of the present invention.

Referring now to monitor, sense and control module 18, including input waveform scaler and rectifier 23, "RMS" logic 24, sync pulse generator 26 and logic converter are illustrated in block diagram of FIG. 6 and in electrical circuit detail in FIGS. 7 through 10. Microcontroller 18 utilizes four different signals (inputs) to make decisions and provide control for the high frequency inverter ballast 14, namely turning it on or off, as appropriate when there is an unstable or stable power supply to lamp L. Those skilled in the art will recognize that each of these input signals need to be conditioned as to properly adjusted voltage or current level, and rectified or shaped and filtered in order to meet the input criteria of the microcontroller 40 (FIGS. 1 and 15). The four internal circuits in monitor 18 which perform the identified functions are input waveform scaler and rectifier 23, "RMS" value logic 24, sync pulse generator 26 and logic converter 28. FIG. 7 illustrates the embodiment of input waveform scaler and rectifier 23 for the described system D. Scaler and rectifier 23 provides a "real-time" view of the AC supply signal, scaled down and rectified to meet the input requirement of microcontroller 40 (analog input to pin 7). As illustrated, scaler and rectifier 23 receives the AC supply input through EMI isolation filter 11 and supplies the analog replica to the analog to digital converter pin of microcontroller 18 and to the "RMS" value logic circuit 24. "RMS" value logic circuit (FIG. 8) generates a logic signal (1 or 0) based upon the level of the AC supply being received from the switched AC line, i.e., power to the HID ballast 12. As discussed earlier, the representative AC input signal is received by logic circuit 24 from input waveform scaler and rectifier 23, and is divided, rectified, filtered and converted to a near equivalent "DC" signal proportional to the input AC supply level. This signal is then supplied to one of the comparators of an integrated circuit (U4B) which provides a digital output (1 or 0) depending upon whether the observed DC equivalent level is higher or lower than the preset level (representing the value above which the HID ballast can operate the lamp L). In the present embodiment, this signal is sent to microcontroller 40 at pin 2.

Figure 9:
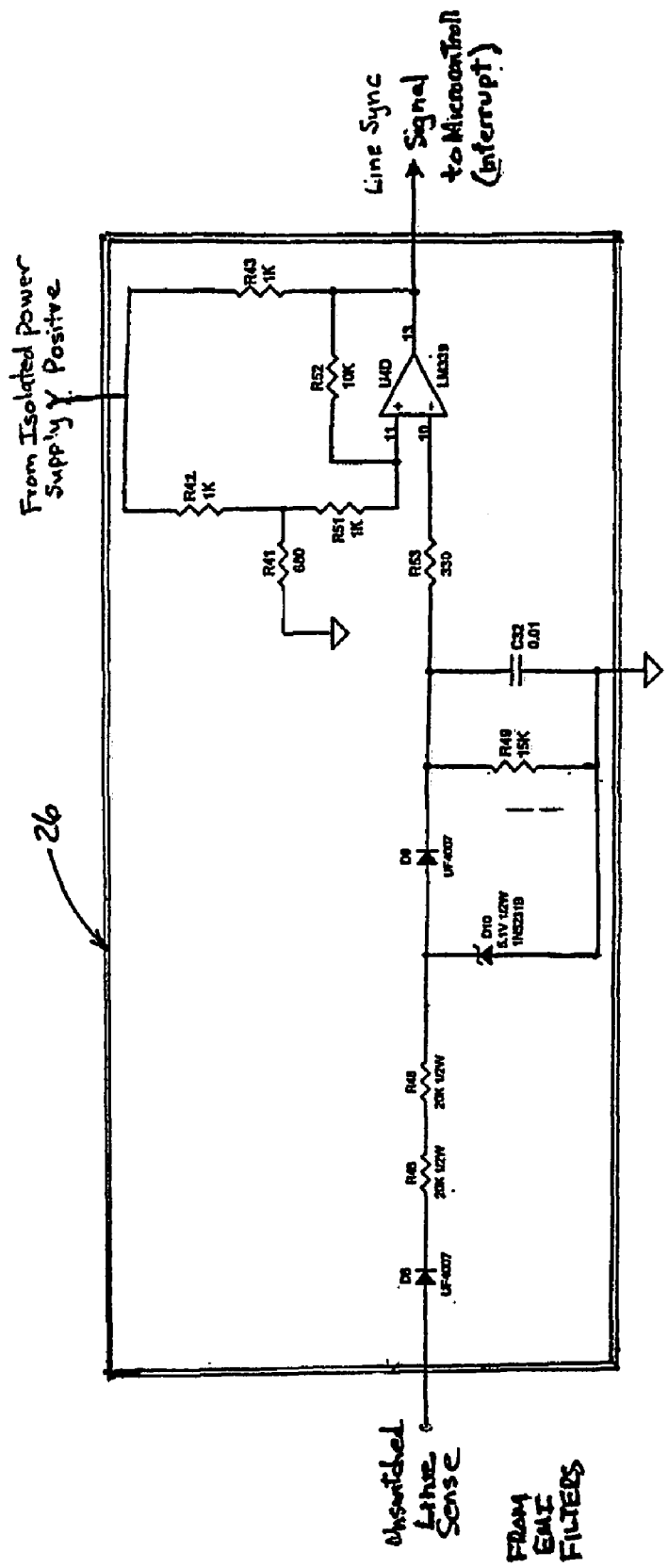
FIG. 9 is a circuit diagram of the sync pulse generator of the arc maintenance device of the present invention.

Referring now to FIGS. 6 and 9, sync pulse generator 26 provides a logic pulse which is synchronized with the AC supply to signal the presence of an AC wave at a set point or time in order to allow the microcontroller 40 to establish the software synchronization and timing for the flow of the program as illustrated in the flow chart of FIG. 2. The sync pulse generator divides, rectifies, filters and converts the AC supply signal (from the EMI isolation filter 11) to a rectified square wave in synchronization with the input "switched" line, i.e., that going to the HID ballast 12. The processed square wave is sent to a comparator (U4D) which provides the logic pulse (1) to microcontroller 40 (pin 5) which is used as the sync or "interrupt" pulse for program synchronization. Of note is that the comparator U4D receives power from isolated power supply 30 (FIG. 15) to ensure a noise free operation since HID lamps are notorious for noise generation which interferes with microcontroller operations.

Figure 10:
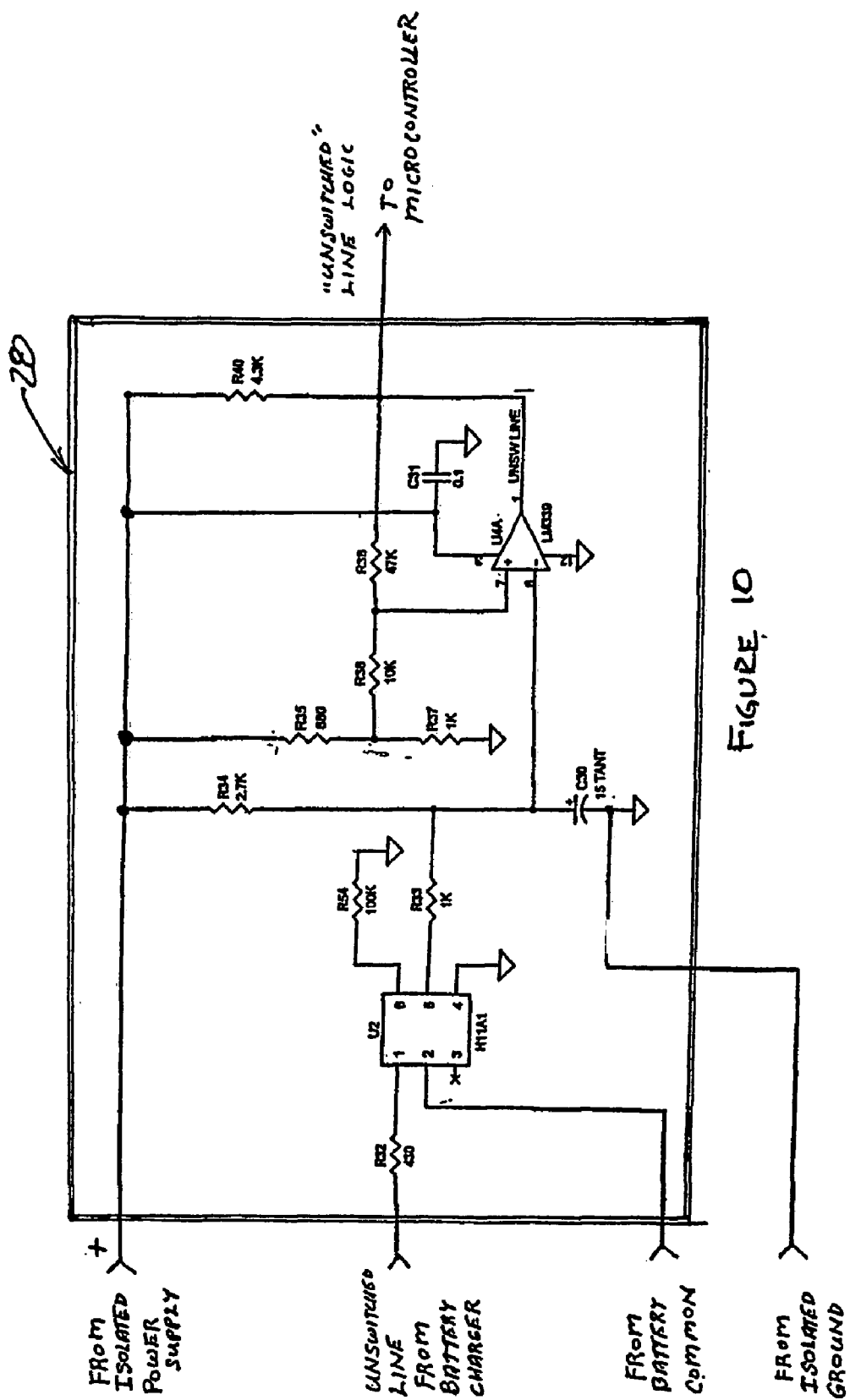
FIG. 10 is a circuit diagram of the logic converter circuit of the arc maintenance device of the present invention.

FIGS. 1 and 10 illustrate the logic converter circuit 28 which distinguishes for microcontroller 40 that the absence of power to system D is the result of a failure or interruption of power to the system as compared to the moving of the HID lamp L off switch S to the off position. The input to circuit 28 comes from the AC supply line before the wall switch S, and through the EMI filter 11 to the circuit 28 wherein a digital output of integrated circuit U4A outputs a 1 for the presence of power and a 0 for the absence of power, which is provided to microcontroller 40 on pin 3. Inverter On/Off driver circuit 32 (FIG. 11) receives a signal from microcontroller 40 when it has determined that an arc maintenance current is to be supplied to lamp L as by energizing the high frequency inverter ballast 14. Driver circuit 32 operates as a switch, receiving the "ON" signal for the ballast 14 from pin 6 of microcontroller 40 which provides the signal to transistor switch Q5 to close and power the high frequency inverter ballast form battery 16. Conversely, when microcontroller 40 determines that the high frequency inverter ballast 14 is to be turned off, it opens switch Q5 and also causes the control rail to be clamped to ground to ensure a positive turn off of the ballast inverter 14.

High frequency inverter ballast 14 (FIGS. 1 and 12) converts energy from battery 16 into a high frequency AC suitable to maintain current in the arc of lamp L. The ballast is generally similar in form to ballasts for gas filled lamps wherein the inverter is a current fed, self resonant push-pull converter utilizing transistor switches and a composite transformer. The output of the inverter 14 includes capacitors which provide ballasting for the arc maintenance current. Intermediate HID ballast 12 and lamp L, an isolation filter 22 (FIGS. 1 and 13) is located such that the output of high frequency inverter ballast 14 may be connected between filter 22 and lamp L whereby HID ballast 12 and high frequency inverter ballast 14 may simultaneously supply lamp L, filter 22 blocking any flow of the arc maintenance current from ballast 14 into the HID ballast 12. Also providing filtering or blocking of electromagnetic interference are EMI interference filters 11 (FIGS. 1 and 14) which are disposed between the AC lines (switched and unswitched) and the HID and inverter ballasts 12, 14, including battery charger 20 and monitor 18. Such blocking filters attenuate the high frequency signals generated by the ballasts and prevents these signals form reaching the AC supply line and causing interference "up system".

Figure 11:
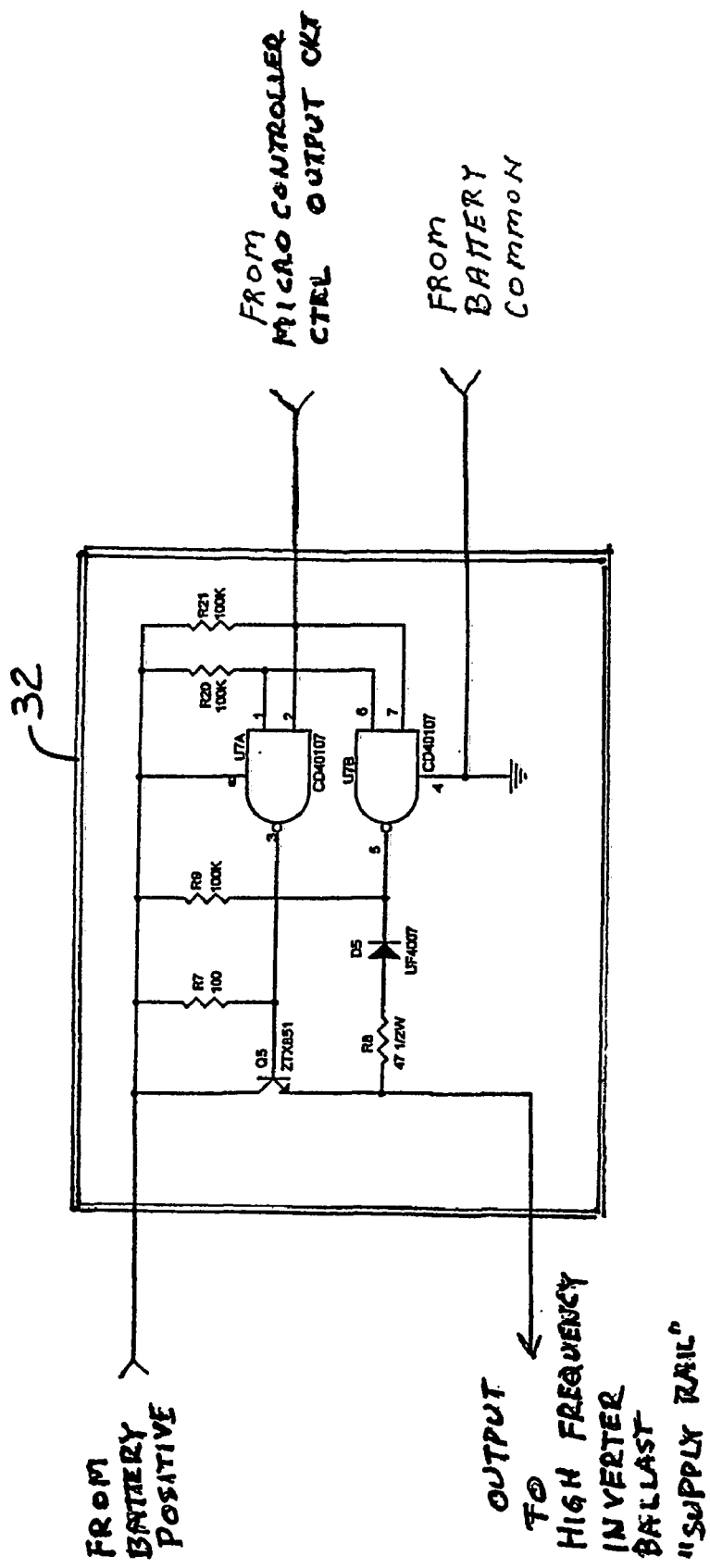
FIG. 11 is a circuit diagram of the inverter ON/OFF control driver circuit of the arc maintenance device of the present invention.
Figure 12:
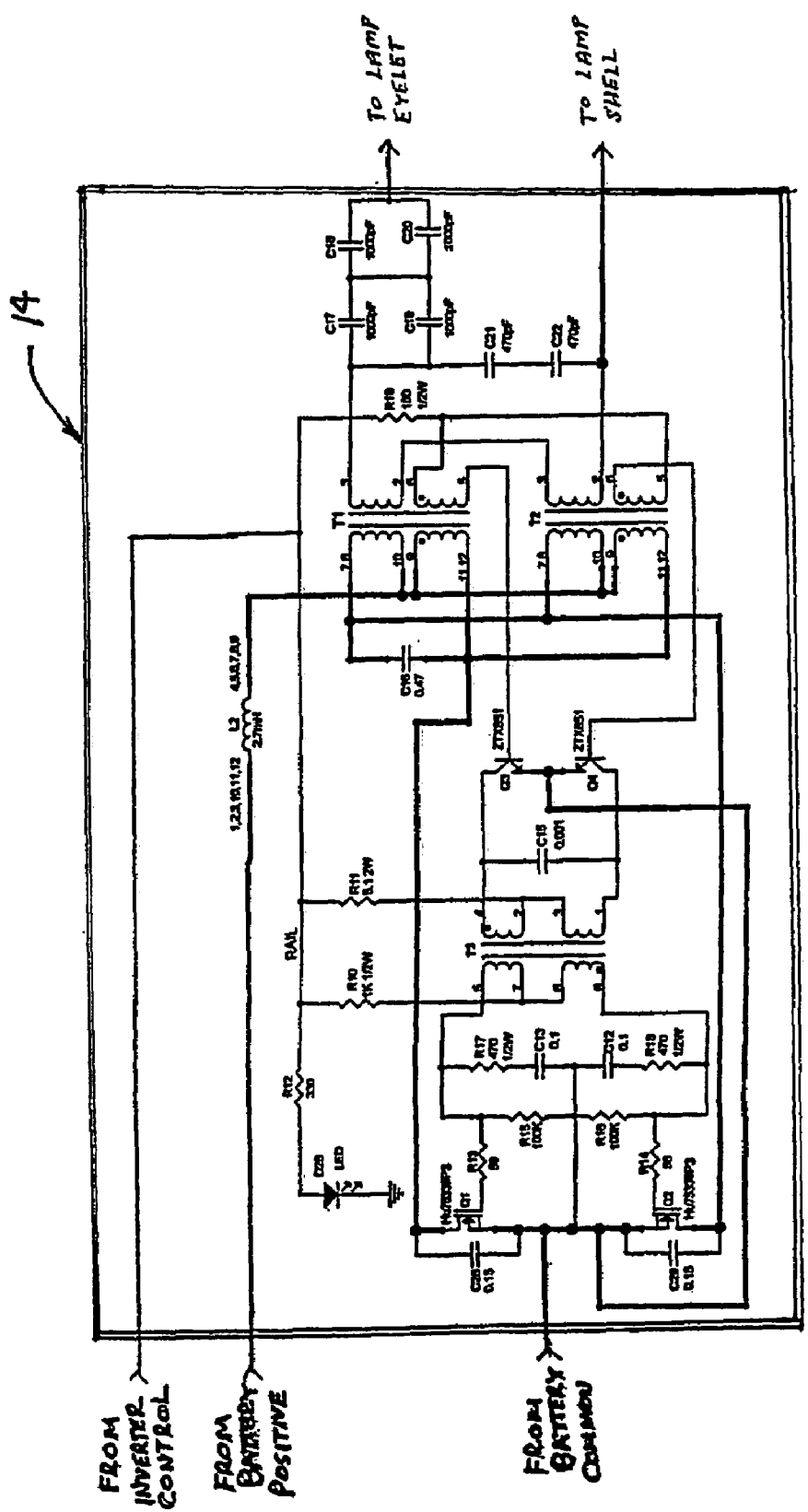
FIG. 12 is a circuit diagram of the high frequency inverter ballast of the arc maintenance device of the present invention.
Figure 13:
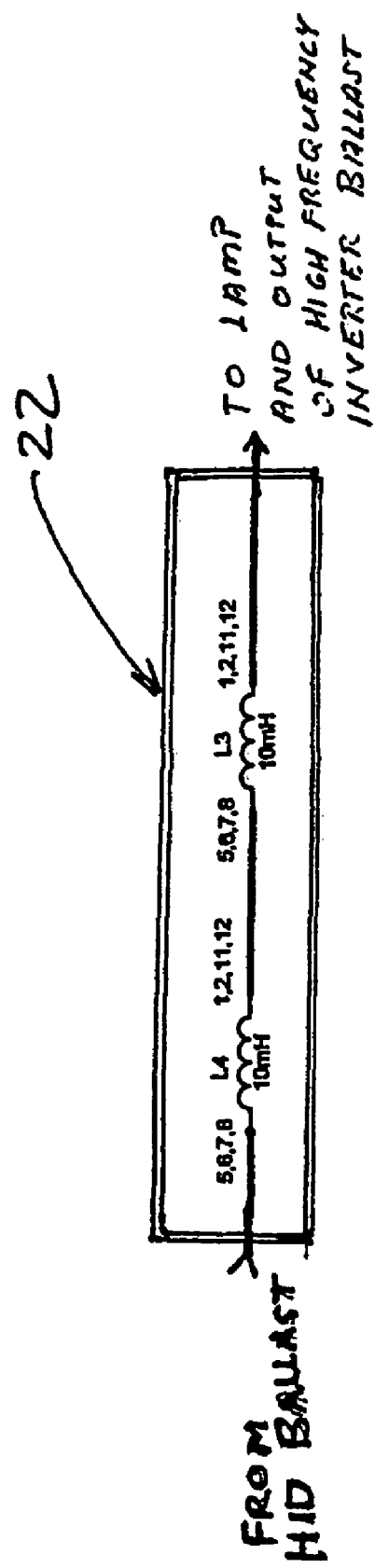
FIG. 13 is a circuit diagram of the isolation filter of the arc maintenance device of the present invention.
Figure 14:
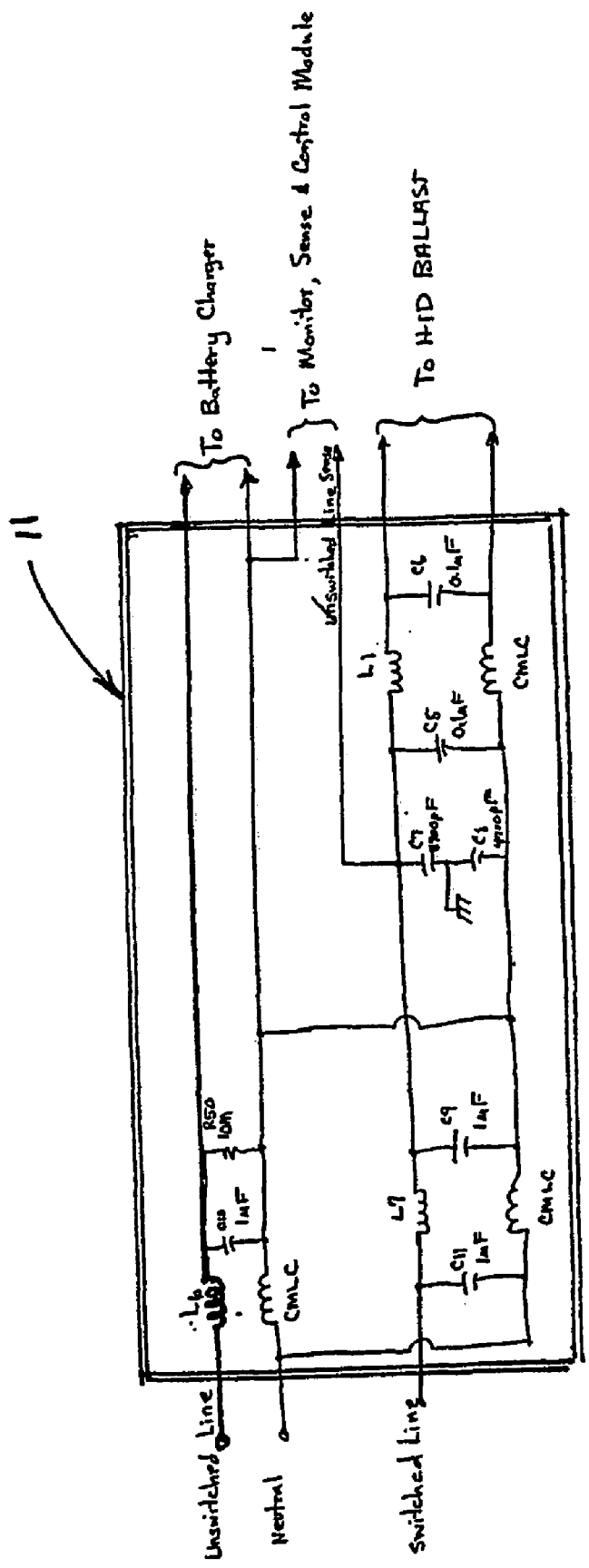
FIG. 14 is a circuit diagram of the EMI filters of the arc maintenance device of the present invention.

The microcontroller circuit 40 (FIGS. 1 and 15) performs the regimen of the functions illustrated in the flow chart of FIG. 2. Microcontroller circuit 40 includes a microcontroller 35 (Microchip P1C12C671) in the illustrated embodiment and an isolated power supply 36, a low battery reset circuit 38 and an optocoupler 43 (for additional isolation). The isolated power supply 36 takes DC voltage from battery 16 and provides an isolated, regulated 5 VDC supply to the microcontroller 35 and associated signal conditioning and inverter control circuitry. Isolation is necessary to prevent the introduction of noise and interference into the microcontroller and associated circuitry from the AC supply and inverter circuitry 14. The low-battery reset circuit 38 provides a logic signal "0" when the battery voltage is low and approaching that at which microcontroller will not reliably operate and a signal of "1" when battery voltage is in the acceptable range. This signal is utilized to reset the microcontroller, which returns the software or program operation to the beginning. The optocoupler 43 provides an isolated control output signal from the microcontroller 35 to the inverter ON/OFF control driver circuit 32 (FIG. 11). Microcontroller 35 utilizes the above described four input signals to execute the decisions and control the high frequency inverter ballast, in accordance with the program illustrated in flow chart of FIG. 2.

ALTERNATIVE EMBODIMENTS

Figure 22:
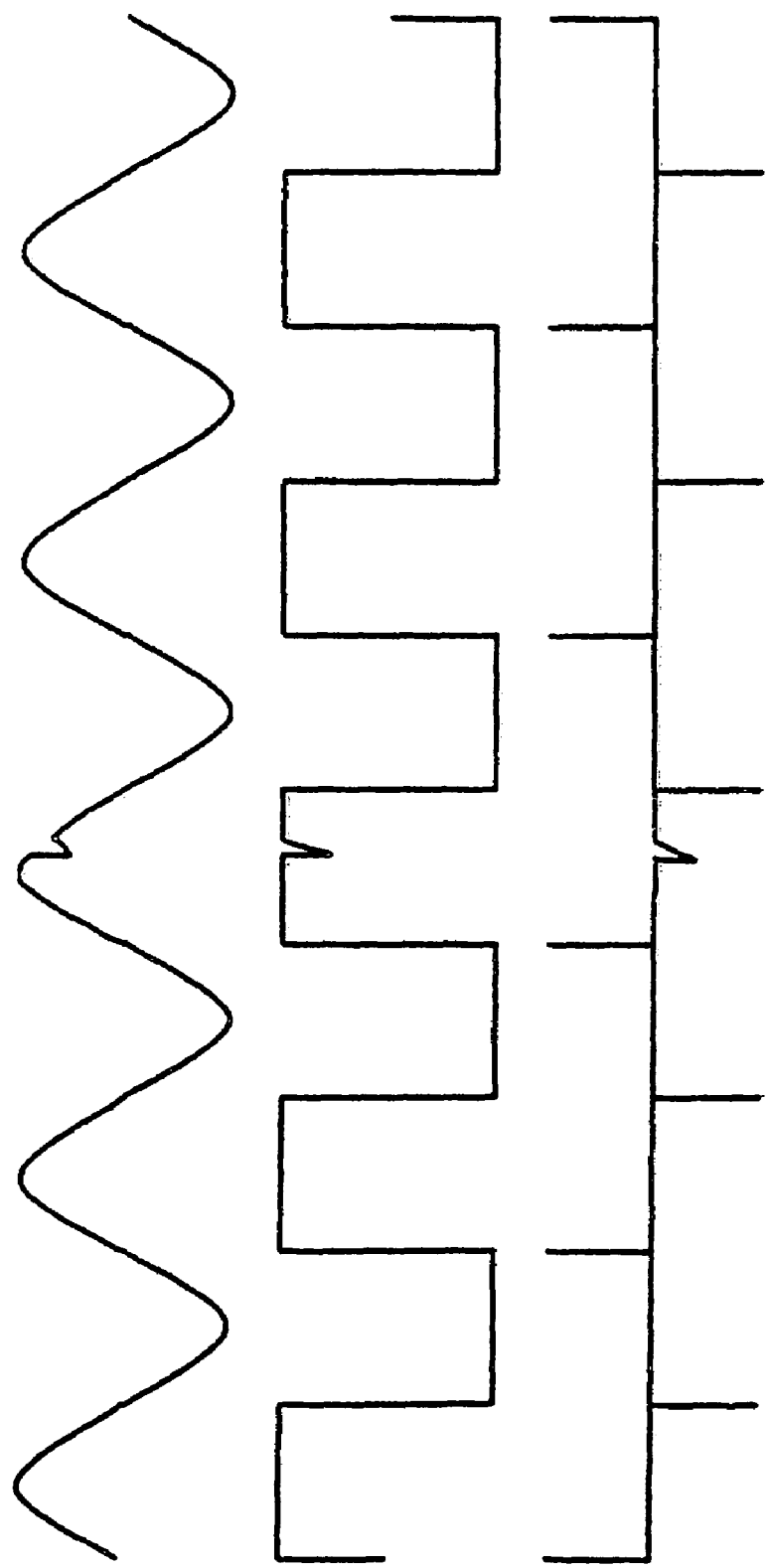
FIG. 22 is an illustration of waveforms including irregularities detected by the present invention.

One of the alternative applications of the waveform monitor of the present invention is in respect of observing of a waveform and when a particular deviation is noted, to activate a circuit or device to further assess or scrutinize the deviating waveform. A direct application of the technology may be in respect of an Oscilloscope Triggering Device. The typical storage oscilloscope does not have the ability to trigger off of waveform deviations depicted in the periodic waveforms illustrated in FIG. 22. In order to detect an irregularity in a monitored waveform, the operator would have to be viewing the waveform at the time to note a deviation and then take action to store that individual waveform to the exclusion of others. The typical storage oscilloscope triggers its sweep by detecting the presents of a particular point on a monitored signal that is selected by the operator. The operator would choose a trigger level and a trigger slope to define this triggering point on the monitored waveform.

Figure 16:
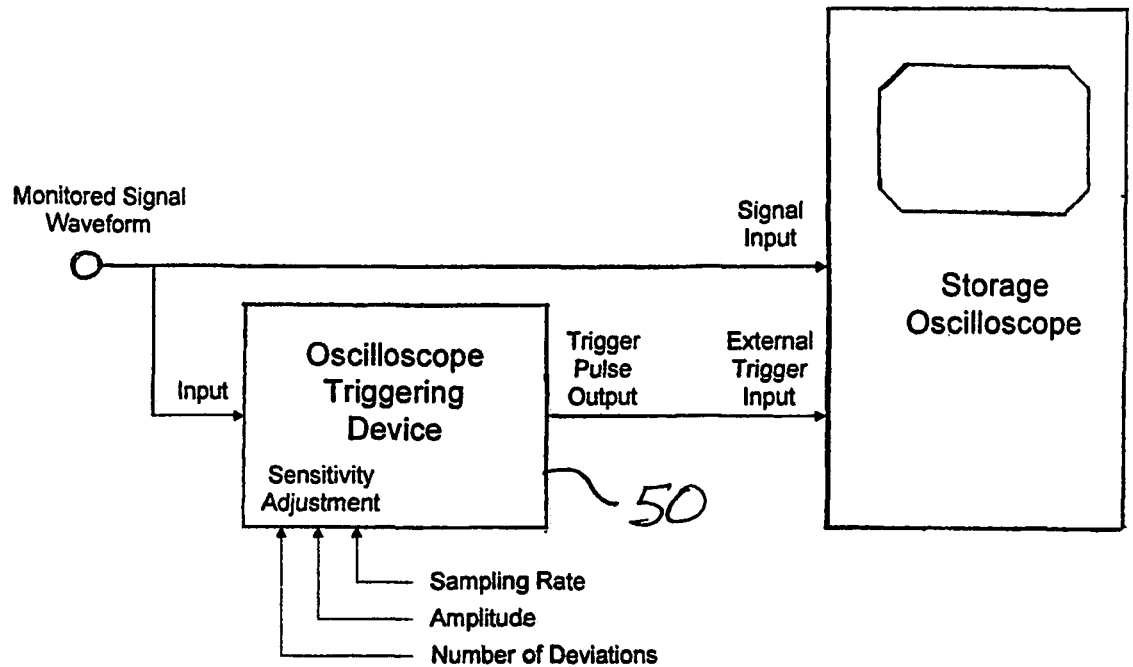
FIG. 16 is a block diagram of an embodiment of the invention connected to a storage oscilloscope.

According to an embodiment of the present invention designated the Oscilloscope Triggering Device (OTD) which incorporates the windowing monitoring technique of the present invention (i.e., that portion of the invention illustrated at FIGS. 3 and 4a through 4c and described in reference thereto, the adapted storage oscilloscope could detect the deviations and provide a trigger signal to the storage oscilloscope. Thereby, making it easier to capture the occurrence of the deviations in the waveforms like the ones depicted in FIG. 22. As depicted in FIG. 16, an operator would be able to adjust the sensitivity of the OTD 50 by controlling three parameters through a microcontroller analogous to microcontroller 40 in the previously described embodiment for maintaining the HID arc. Rather than having a set value of "in tolerance" data points (three in the arc maintenance embodiment), the number may be made variable with an input to the microcontroller for the OTD 50. Likewise, the operator may specify the sampling rate (number of windows per second and the width of the window), the amplitude deviation (height of the window), and the number of consecutive deviations defining a trigger point. This allows the operator to set the waveform deviation sensitivity to both width of disturbance and amplitude of the disturbance. All parameters which are selected to be represented in software may be by software variables that may be set or changed by analog or digital inputs to the microcontroller. Any of these parameters (included) may be set by the user via either analog or digital inputs to the microcontroller, according to the type of microcontroller selected for the particular embodiment. For example, with 3 digital inputs there could be 8 possible values for a parameter. If an analog input is used, there could be many reasonable values for the variable. For example, a 0 to 5-Volt analog signal could supply 256 different values on an 8-bit A/D input port. The microcontroller can be upgraded to one that provides more analog and digital inputs, as well as, run at higher clock frequencies so that more parameters may be included and more windows may be included in the scan.

The sensitivity of the device in detecting a waveform deviation is a function of several parameters. These parameters are the sampling rate (the width of the window or the number of windows per second), the amplitude deviation (height of the window), and the number of consecutive deviations defining a trigger point (the number of consecutive sampled data points that define an error). The ability to adjust the sensitivity of the device allows the user to fine-tune the device to fit their electrical environment and desired outcome.

Figure 17:
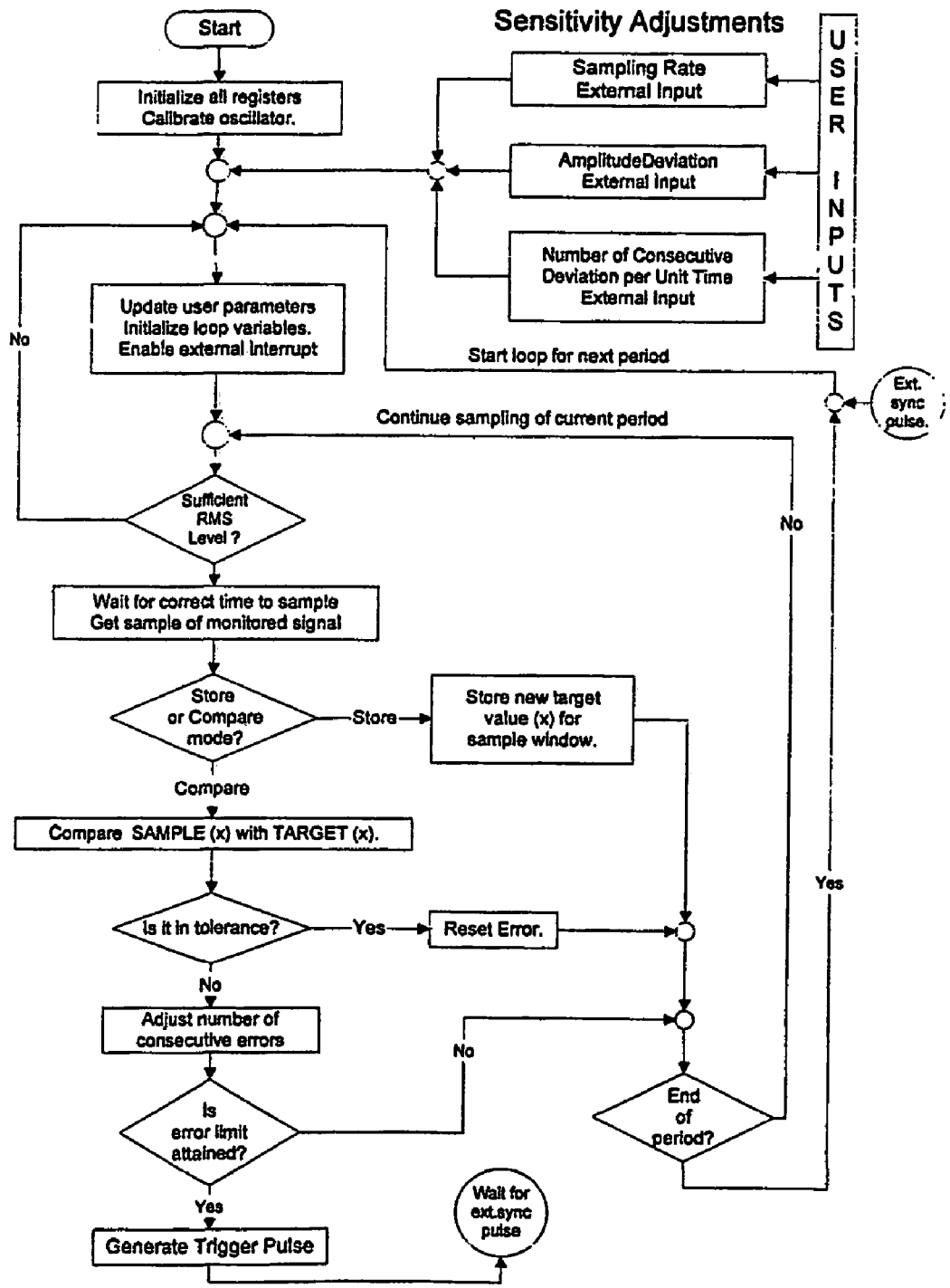
FIG. 17 is a flow chart showing the method of monitoring of the embodiment of the invention shown in FIG. 16.

The versatility of adding a triggering function responsive to a changed waveform to enable viewing on a storage oscilloscope provides significant added function to the oscilloscope. Since the monitoring of the waveform may be done in an isolated device such as a microcontroller as illustrated in the arc maintenance function, the apparatus lends itself to either a stand alone device or an integral part of such as the oscilloscope. Thus, the OTD could be incorporated into the oscilloscope by the oscilloscope manufacturer or could be supplied separately as unit equipment, and operate as depicted in FIG. 16. The flow chart of FIG. 17 illustrates the typical routine of the OTD in monitoring an input to an oscilloscope and providing an output pulse in response to the detection of the irregularity. The functional flow is analogous to that shown in FIG. 2 for the ARC Maintenance device during the period of time when the incoming power waveform is being monitored for stability.

A further embodiment and application of the present invention for waveform monitoring is in respect of a Simple Line-Noise Monitor. AC line waveforms are ideally purely sinusoidal. However, real AC line waveforms such as in power supplied from public and private utility systems are not purely sinusoidal. Rather they contain noise signals, waveform notches, amplitude spikes or dips, and voltage variations lasting several periods. In the case of utility power, the irregularities are introduced into the supply by way of feed-back from the user of the supplied power. Most electrical equipment survives such AC line environments without disruption in operation or service. These waveform aberrations often go unnoticed; however, electrical and electronic equipment are becoming more sensitive to these waveform problems and are showing signs of intolerance to such AC line environments. In industry, when problems with electrical equipment or computers occur, suspecting AC line quality problems is often first on the list of possible causes. Verification of poor AC line conditions can be time-consuming and costly. AC line disturbances often occur at random. It can be quite difficult to "catch" a disturbance and then to characterize it after the event has passed. Thus, there is a need for a simple monitoring device that detects an AC line disturbance and indicates to the user that a disturbance has occurred. Accordingly, at the recognition of the alarm or signal of a particular degree of irregularity (analogous to the sensing of the unstable supply to the HID arc), an operator may be alerted to the potential for an equipment malfunction due to unstable power supply.

Figure 18:
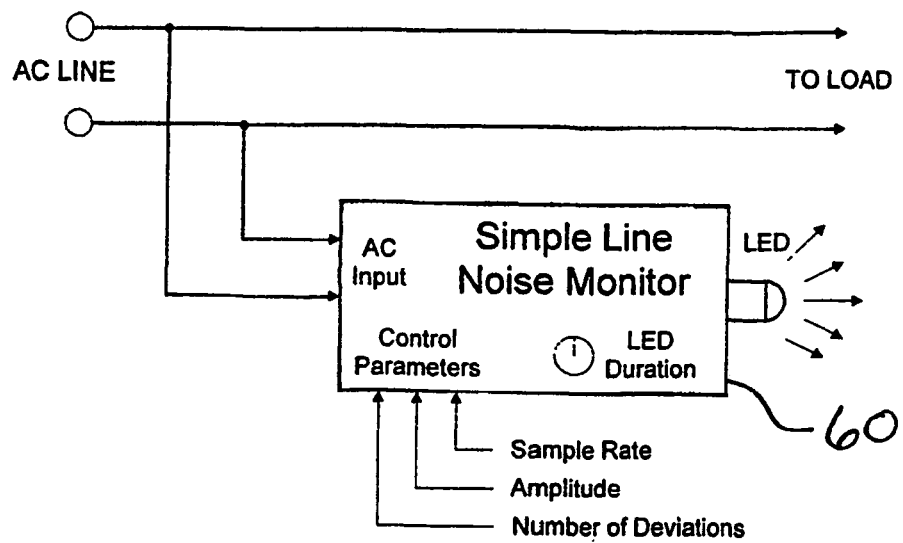
FIG. 18 is a block diagram of an embodiment of the invention for a simple line-noise monitor.
Figure 19:
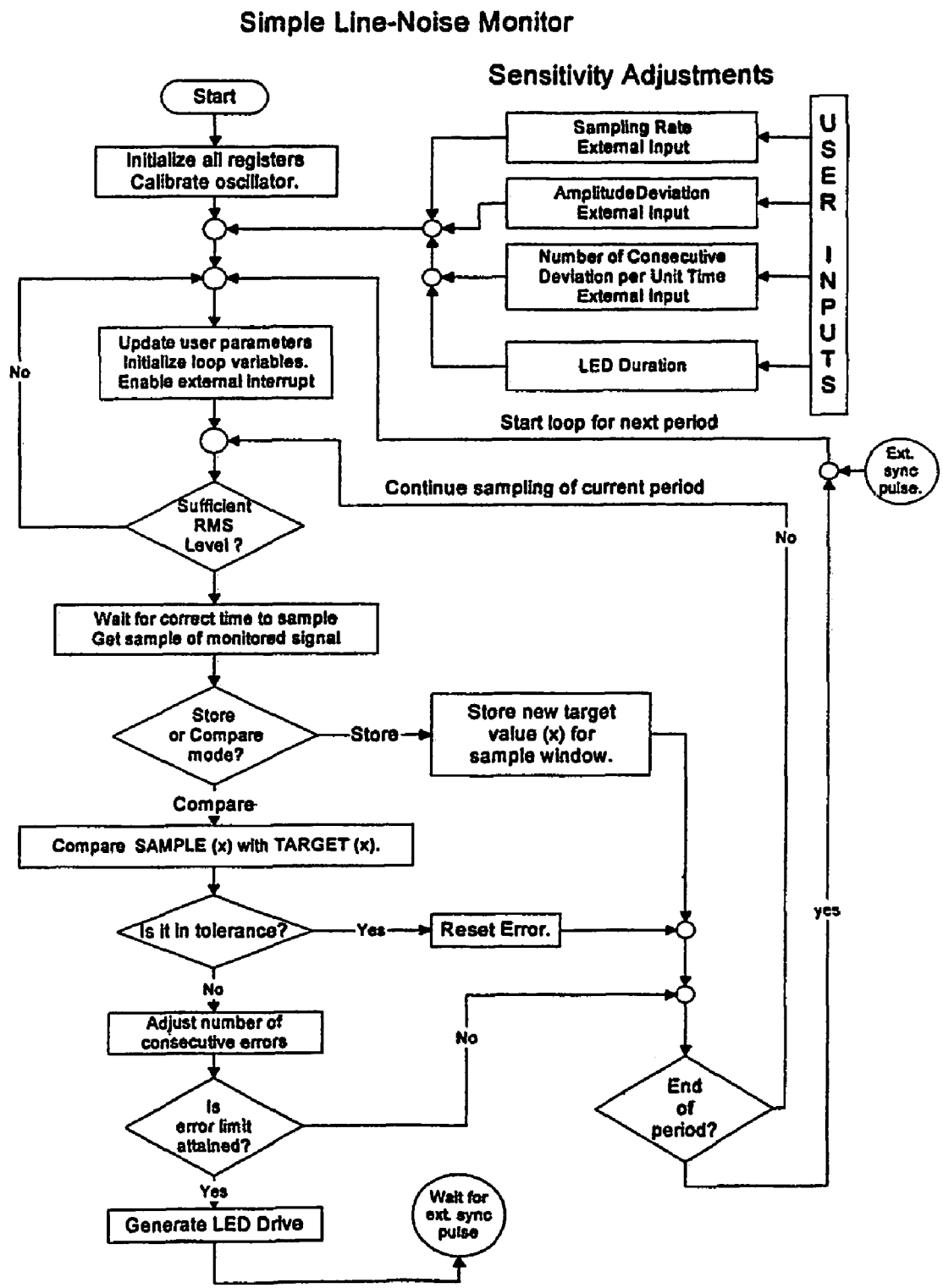
FIG. 19 is a flow chart showing the method of monitoring of the embodiment of the invention shown in FIG. 18.

In the embodiment illustrated in FIG. 18, the Simple Line-Noise Monitor device 60 (SLNM) attaches to the AC line at or near a particular load which is sensitive to stable supply. The device monitors the AC line of questionable stability supplying power to a sensitive electrical load. If an unstable event occurs, the device indicates this by lighting an LED 62. The LED 62 can be programmed in the internal control microcontroller for the SLNM 60 to be "on" for a short duration or held "on" until an operator resets the SLNM 60 clear the LED indicator and ready the unit for monitoring another unstable event. In order to establish a trigger level that constitutes an AC line "disturbance," control parameters are set by the user to quantify a real "disturbance." These control parameters are sampling rate, amplitude deviation, and number of consecutive deviations per unit time. The Simple Line-Noise Monitor (SLNM) takes advantage of the simplicity of the device and the waveform adaptability feature of the OTD illustrated and described in connection with FIGS. 16 and 17. The sensitivity adjustments allow the user to further adapt the device to the present electrical environment with a minimum of set-up time (see the Simple Line-Noise Monitor flow diagram in FIG. 19.) The circuitry feeding the microcontroller is adapted to include either digital or analog user-setable controls. As those skilled in the art will understand, these are selected according to available components, the complexity or degree of the noise to be monitored and the extent of the output signal/information to be included in the preferred embodiment. Each of the different adjustable parameters may be converted to either digital or analog signals that the microcontroller will read directly. Once the microcontroller reads these input parameters, it then sets internal software variables accordingly. The microcontroller will continue to read these input parameters and update the internal software variables. Instead of using the microcontroller to operate an inverter ballast for HID lighting as described in the first embodiment and FIG. 1, the output of the microcontroller will simply drive circuitry that would drive an LED. The manner in which the LED indicates an "event" is selected according to the user's need/preference, such as light, sound, or combination. The advantage in using this SLNM is that it has the previously described (as with the arc maintenance device D by means of microcontroller 18) ability to adapt to the local AC line waveform environment by storing the waveform in memory and utilizing a microcontroller to "update" itself to the present conditions. In this way, the monitor avoids comparing the waveform to an "ideal standard;" rather, the waveform is compared to itself and only the random "disturbances" are detected and indicated. The SLNM preferably includes the adaptive feature so that the SLNM device is not forced to compare waveforms to a pre-defined ideal mathematical model. The device may thus adapt to any periodic waveform a user wishes to monitor. This feature allows the definition of an "event" on an individual user environment basis. By comparison to the ARC Maintenance embodiment illustrated in FIG. 1, wherein the "event" definition is already pre-defined for since the load, and the intended environment, as well as, the expected imperfections allowed by HID lighting ballasts are known and thus incorporated to avoid having to be reset for each use. The routine is nearly the same, except that the SLNM allows these parameters to be user defined, since applications are expected to vary with uses. There are however, certain absolute limits, within reason, that must also be met in order for the waveform to pass as an acceptable waveform. AC line waveforms vary in small ways among different locations within the same building establishment; however, they are typically very similar generally in frequency and RMS value. The SLNM's unique adapting ability takes these generalizations into consideration while detecting "real" AC line disturbances. The flow chart of FIG. 19 illustrates the SLNM, including the user inputs analogous to those described for the OTD and the similar routine for monitoring of the input waveform.

Figure 20:
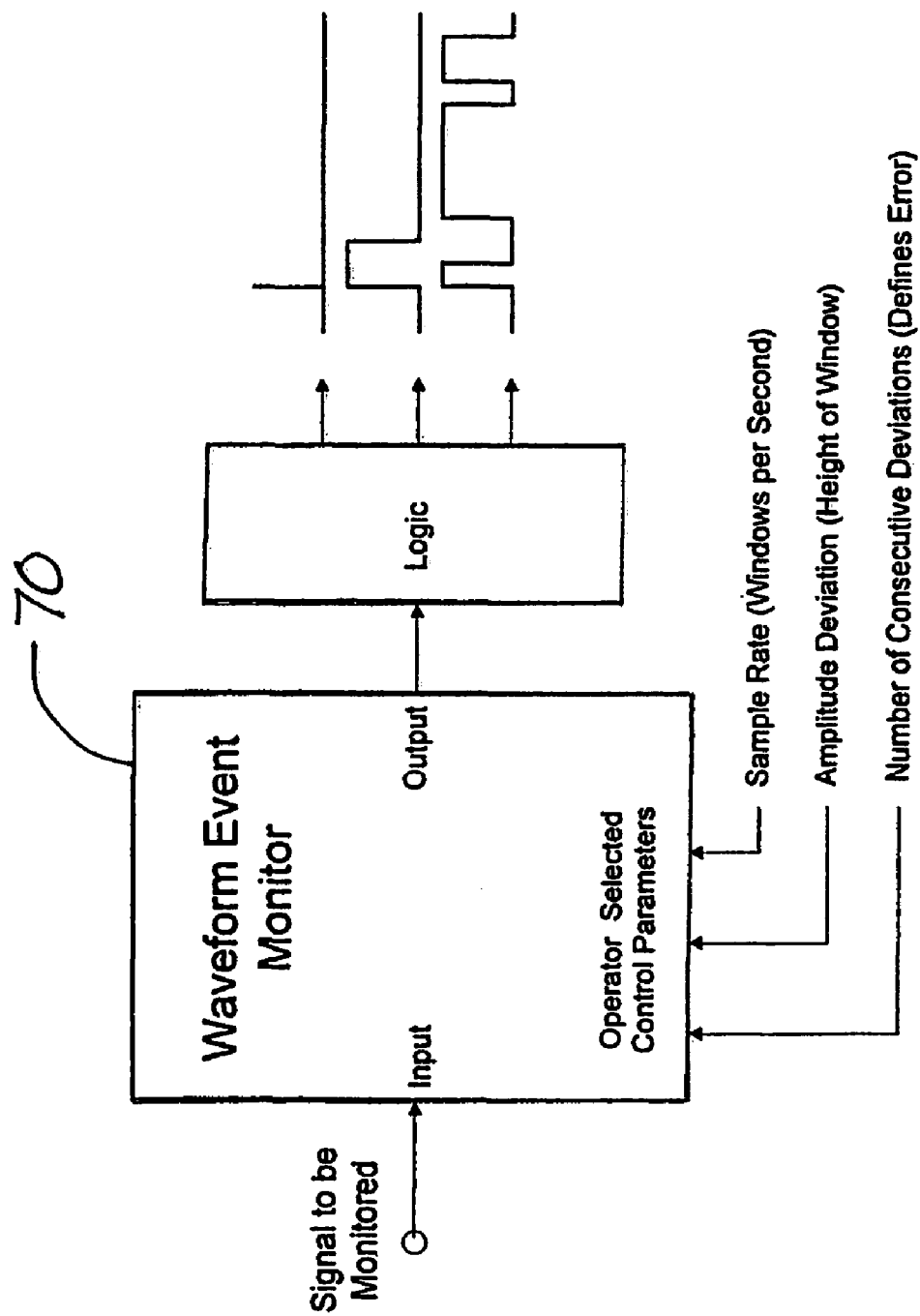
FIG. 20 is a block diagram of an embodiment of the invention for a waveform event monitor.

An additional application of the present invention is in an embodiment for a Waveform Event Monitor illustrated in FIG. 20. The Waveform Event Monitor 70 uses the same input features as the SLNM. The WEM 70 does everything the SLNM does and adds several functions. The difference is that the output circuitry and the software to accommodate the output circuitry is adapted to incorporate a more detailed analysis of the event to advise the user of selected parameters of the irregular waveform, all of which follows directly from detecting an "event." As those skilled in the art will understand, waveform diagnostics or analysis equipment may be as simple as an LED indicator or as complex as a computer. The WEM 70 illustrated provides three different outputs: a One Shot, a Trigger pulse, or a Toggle. As those skilled in the art, the microcontroller for the WEM 70 may be chosen as a more powerful device than of the embodiments previously illustrate, that perhaps has 16-bit or 32-bit capability, or that has more memory, or more I/O. AC line waveforms typically contain unwanted disturbances such as noise signals, waveform notches, amplitude spikes or dips, and voltage variations lasting several periods. These disturbances occur at random and represent a change from the normal supply waveform. Most electrical equipment survives such input signal environments without disruption in operation or service. These waveform aberrations often go unnoticed; however, electrical and electronic equipment is becoming more sensitive to these waveform problems. In industry, when problems with electrical equipment or computers occur, suspecting input signal quality problems is often first on the list of possible causes. These type problems with the supply can also occur on DC supply lines. Needed is a monitoring device that detects a line disturbance and indicates to the user that a disturbance (or change) has occurred so that these events can be quantified.

Figure 21:
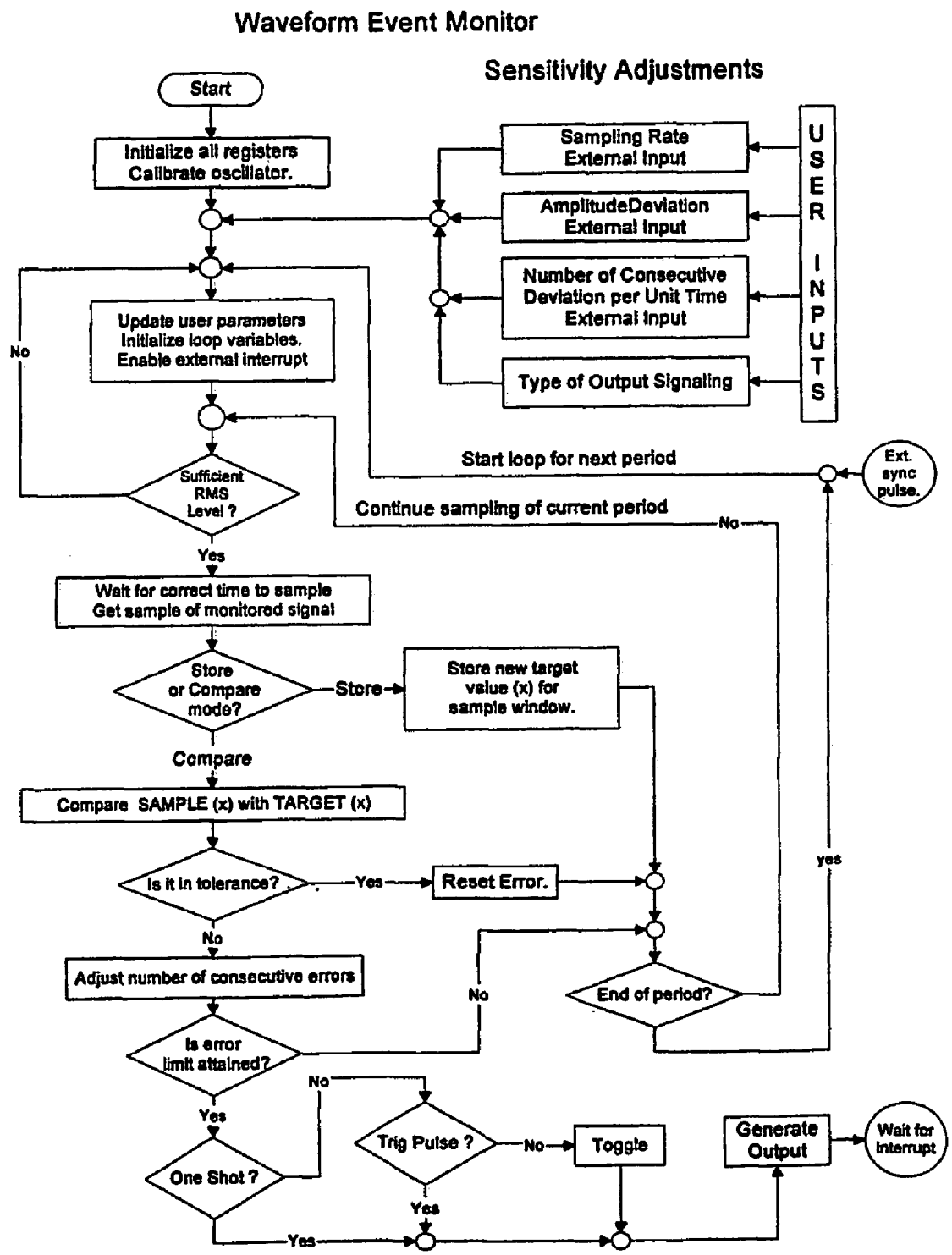
FIG. 21 is a flow chart showing the method of monitoring of the embodiment of the invention shown in FIG. 20.

The Waveform Event Monitor (WEM 70) is a device that monitors the input signal and provides an output signal each time a disturbance (or change) is detected. The output is a digital signal that can then be used in many ways to quantify events. For example, the output can be sent to a logic input of a computer to then record any number or set of event quantifiers, such as, the number of events per-unit-time, or the time between events, or the rate of cluster events. As those skilled in the art understand, the necessary program to do particular analysis for waveform irregularities must be chosen for the particular need; and the routine may be as simple or as complex as the selected task. Function input cards for a computer that is to interface with equipment signaling events are readily available from many data acquisition card suppliers. The choice of the WEM 70 is for detailed waveform event monitoring, and that a computer is not necessary to use the WEM 70. If one chooses to use a simple signaling device such as a bell or buzzer or LED to identify the "event", then the logging events might be by hand throughout a particular (short) testing time. Once some data is accumulated, it is a simple matter to use hand calculations and arrive at some statistical conclusion. The computer comes into play when significant types and numbers of "events" are to be logged and various analyses of the data are to be made. Many different forms of event knowledge could then be used to determine the nature or cause of the supply disturbances. Further usage incorporates replacing the computer with a "smart" counter or timer so that in combination with the WEM 70, the device becomes a portable Input Signal Event Monitor with an intelligent output. FIG. 21 illustrates the flow chart for the monitoring sequence followed by the typical WEM 70 described.

In order to establish a trigger level that constitutes a input signal "disturbance," control parameters are set by the user to qualify a real "disturbance." These control parameters are operator-selected. The operator can specify sampling rate (number of windows per second), the amplitude deviation, and number of consecutive deviations per unit time.

The advantage in using this WEM 70 is that it has the ability to adapt to the local supply-line waveform environment by storing the waveform in memory and utilizing a microcontroller to "update" itself to the present conditions. In this way, the monitor avoids comparing the waveform to an "ideal standard;" rather, the waveform is compared to itself and only the random "disturbances" are detected and indicated. There are however, certain absolute limits, within reason, that must also be met in order for the waveform to pass as an acceptable waveform. Supply-line waveforms vary in small ways among different locations within the same building establishment; however, they are typically very similar generally in frequency and RMS value. The WEM 70's unique adapting ability takes these generalizations into consideration while detecting "real" line disturbances.

The disclosed methods and embodiments are to be considered in all respects as illustrative and not restrictive. Those skilled in the art will recognize that variations may be made in the interrogation signal word style, the sequencing, timing and phasing of the process as well as variations in the hardware for accomplishing the test function without departing form the spirit of the invention. The scope of the invention is to be defined by the appended claims rather than the foregoing descriptions and other embodiments which come into the meaning and range of equivalency of the claims are therefore intended to be included within the scope thereof.

What is claimed is:

1. Apparatus for supplying a supplemental power to the arc of a gas lamp powered by a inverter ballast responsive to instability of a main power supply comprising:
a rechargeable battery;
a battery charger;
a high frequency inverter ballast for supplying power directly to the gas lamp, selectively connectable to the lamp upon a signal indicating instability of the mains power supply to the lamp;
an isolation filter interposed between the lamp inverter ballast and the lamp whereby said high frequency inverter ballast is connected to the lamp intermediate the isolation filter and the lamp;
a monitor circuit for monitoring the waveform of the mains power supply to the lamp inverter ballast, the monitor circuit detecting and storing a plurality of successive data points representing the waveform and detecting and storing a plurality of successive data points of the next successive waveform, means for comparing successive corresponding data points of the waveform and the next successive waveforms and initiating the operation of the high frequency inverter ballast to supply power to the lamp upon the identification of a predetermined number of consecutive data points of the next successive waveform which deviate by more than a predetermined value from the corresponding stored data points of the waveform.

2. The apparatus according to claim 1 wherein the monitor circuit includes a sync pulse generator to initiate the detecting and storing of data points of the waveform and successive waveform at an established time standard with respect to the waveform.

3. The apparatus according to claim 2 wherein the monitor circuit includes an input scaler and rectifier to generate a rectified voltage replica of the mains power supply waveform and the stored data points are generated from the replica waveform and the next successive waveform.

4. The apparatus according to claim 3 wherein the monitor circuit includes a filter for converting the voltage replica of successive waveforms to a DC equivalent.

5. The apparatus according to claim 4 wherein the monitor circuit includes a logic circuit driven by the filtered DC voltage, said logic circuit providing an output when the level of the filtered DC voltage exceeds a preset level.

6. The apparatus according to claim 1 wherein the monitor circuit includes means for storing as a target waveform, the last successive waveform compared to a prior waveform having fewer than the preset number of consecutive data points deviating from the predetermined value.

7. The apparatus according to claim 6 wherein the monitor circuit includes means for counting the number of the last successive waveform compared to a prior waveform having fewer than the preset number of consecutive data points deviating from the predetermined value.

8. The apparatus according to claim 7 wherein the means for counting provides an output signal upon reaching a preset value of the counted number.

9. The apparatus according to claim 8 wherein the output signal of the counting means signals the high frequency inverter ballast to be disconnected from the lamp.

10. A monitor circuit for monitoring the waveform of an electrical input signal, the monitor circuit including a sync pulse generator to initiate the detecting and storing a plurality of successive data points representing the waveform and detecting and storing a plurality of successive data points of the next successive waveform at an established time standard with respect to the waveform, means for comparing successive corresponding data points of the successive waveform to the prior waveform and providing an output signal upon the identification of a predetermined number of consecutive data points of the next successive waveform which deviate by more than a predetermined value from the corresponding stored data points of the prior waveform.

11. The apparatus according to claim 10 wherein the monitor circuit includes an input scaler and rectifier to generate a rectified voltage replica of the mains power supply waveform and the stored data points are generated from the replica waveform and the next successive waveform.

12. The apparatus according to claim 11 wherein the monitor circuit includes a filter for converting the voltage replica of successive waveforms to a DC equivalent.

13. The apparatus according to claim 12 wherein the monitor circuit includes a logic circuit driven by the filtered DC voltage, said logic circuit providing an output when the level of the filtered DC voltage exceeds a preset level.

14. The apparatus according to claim 10 wherein the monitor circuit includes means for storing as a target waveform, the last successive waveform compared to a prior waveform having fewer than the preset number of consecutive data points deviating from the predetermined value.

15. The apparatus according to claim 14 wherein the monitor circuit includes means for counting the number of the last successive waveform compared to a prior waveform having fewer than the preset number of consecutive data points deviating from the predetermined value.

16. The apparatus according to claim 15 wherein the means for counting provides an output signal upon reaching a preset value of the counted number.

17. The apparatus according to claim 16 wherein the monitor circuit includes a sync pulse generator to initiate the detecting and storing of data points of the waveform and successive waveform at an established time standard with respect to the waveform.

18. The apparatus according to claim 17 wherein the monitor circuit includes an input scaler and rectifier to generate a rectified voltage replica of the mains power supply waveform and the stored data points are generated from the replica waveform and the next successive waveform.

19. The apparatus according to claim 18 wherein the monitor circuit includes a filter for converting the voltage replica of successive waveforms to a DC equivalent.

20. The apparatus according to claim 19 wherein the monitor circuit includes a logic circuit driven by the filtered DC voltage, said logic circuit providing an output when the level of the filtered DC voltage exceeds a preset level.

21. A method of monitoring a periodic waveform including the steps comprising:

establishing a reference point in the period of a periodic waveform by initiating a sync pulse at a preselected point in a waveform to initiate the detecting and storing of data points of the prior waveform and successive waveform at a corresponding established time standard with respect to each waveform;

comparing successive corresponding data points of a prior waveform to a next succeeding waveform and providing a signal upon identification of a predetermined number of consecutive data points of the succeeding waveform which deviate from the corresponding stored data points of the prior waveform by more than a predetermined amount.

22. The method of monitoring according to claim 21 wherein the method of monitoring includes scaling and rectifying of the periodic waveform to generate a rectified voltage replica of the prior waveform and generating the stored data points from the replica prior waveform and the next successive waveform.

23. The method of monitoring according to claim 22 wherein the method of monitoring includes a filtering the converted voltage replica of successive waveforms to a DC equivalent.

24. The method of monitoring according to claim 23 wherein the method of monitoring includes generating a logic signal from the filtered DC voltage, said logic signal providing an output when the level of the filtered DC voltage exceeds a preset level.

25. The method of monitoring according to claim 21 wherein the method of monitoring includes means for storing as a target waveform, the last successive waveform compared to a prior waveform having fewer than the preset number of consecutive data points deviating from the predetermined value.

26. The method of monitoring according to claim 25 wherein the method of monitoring includes means for counting the number of the last successive waveform compared to a prior waveform having fewer than the preset number of consecutive data points deviating from the predetermined value.

27. The method of monitoring according to claim 26 wherein the means for counting provides an output signal upon reaching a preset value of the counted number.

28. The method of monitoring according to claim 27 wherein the output signal of the counting means signals the high frequency inverter ballast to be disconnected from the lamp.

29. A method of monitoring the waveform of an electrical input signal comprising the steps of generating a sync pulse to initiate the detecting and storing a plurality of successive data points representing the waveform and detecting and storing a plurality of successive data points of the next successive waveform at an established time standard, comparing successive corresponding individual data points of the successive waveform to the prior waveform and providing an output signal upon the identification of a predetermined number of consecutive data points of the next successive waveform which deviate by more than a predetermined value from the corresponding stored data points of the prior waveform.

30. The method of monitoring according to claim 29 wherein the method of monitoring includes an input scaler and rectifier to generate a rectified voltage replica of the mains power supply waveform and the stored data points are generated from the replica waveform and the next successive waveform.

31. The method of monitoring according to claim 30 wherein the method of monitoring includes a filter for converting the voltage replica of successive waveforms to a DC equivalent.

32. The method of monitoring according to claim 31 wherein the method of monitoring includes a logic circuit driven by the filtered DC voltage, said logic circuit providing an output when the level of the filtered DC voltage exceeds a preset level.

33. The method of monitoring according to claim 32 wherein the method of monitoring includes means for storing as a target waveform, the last successive waveform compared to a prior waveform having fewer than the preset number of consecutive data points deviating from the predetermined value.

34. The method of monitoring according to claim 33 wherein the method of monitoring includes means for counting the number of the last successive waveform compared to a prior waveform having fewer than the preset number of consecutive data points deviating from the predetermined value.

35. The method of monitoring according to claim 34 wherein the means for counting provides an output signal upon reaching a preset value of the counted number.

* * * * *